A. FERRETTO.
TYPE WRITER.
APPLICATION FILED JAN. 16, 1912.

1,155,651.

Patented Oct. 5, 1915.
19 SHEETS—SHEET 1.

Witnesses:
Olive D. White.
Helen S. Morris.

Inventor:
Andrea Ferretto
By Emil Bruelcher
Attorney

A. FERRETTO.
TYPE WRITER.
APPLICATION FILED JAN. 16, 1912.

1,155,651.

Patented Oct. 5, 1915.
19 SHEETS—SHEET 2.

Witnesses:
Olive D. White
Helen L. Morris

Inventor:
Andrea Ferretto
By his Attorney

A. FERRETTO.
TYPE WRITER.
APPLICATION FILED JAN. 16, 1912.
1,155,651.
Patented Oct. 5, 1915.
19 SHEETS—SHEET 3.
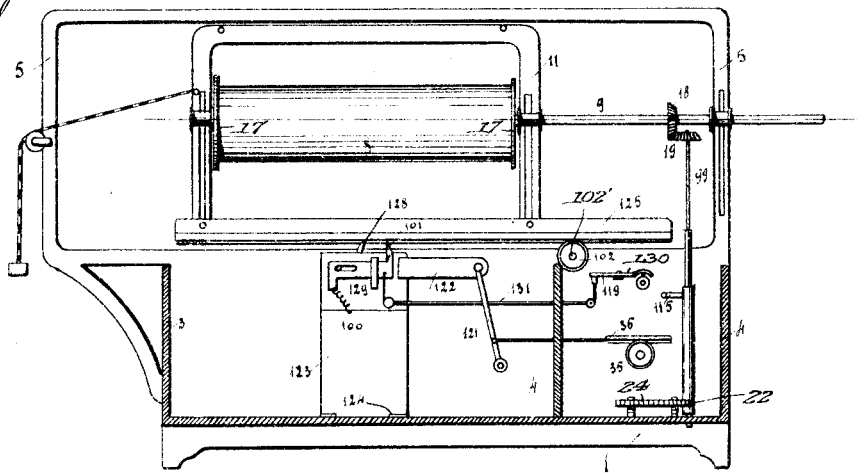

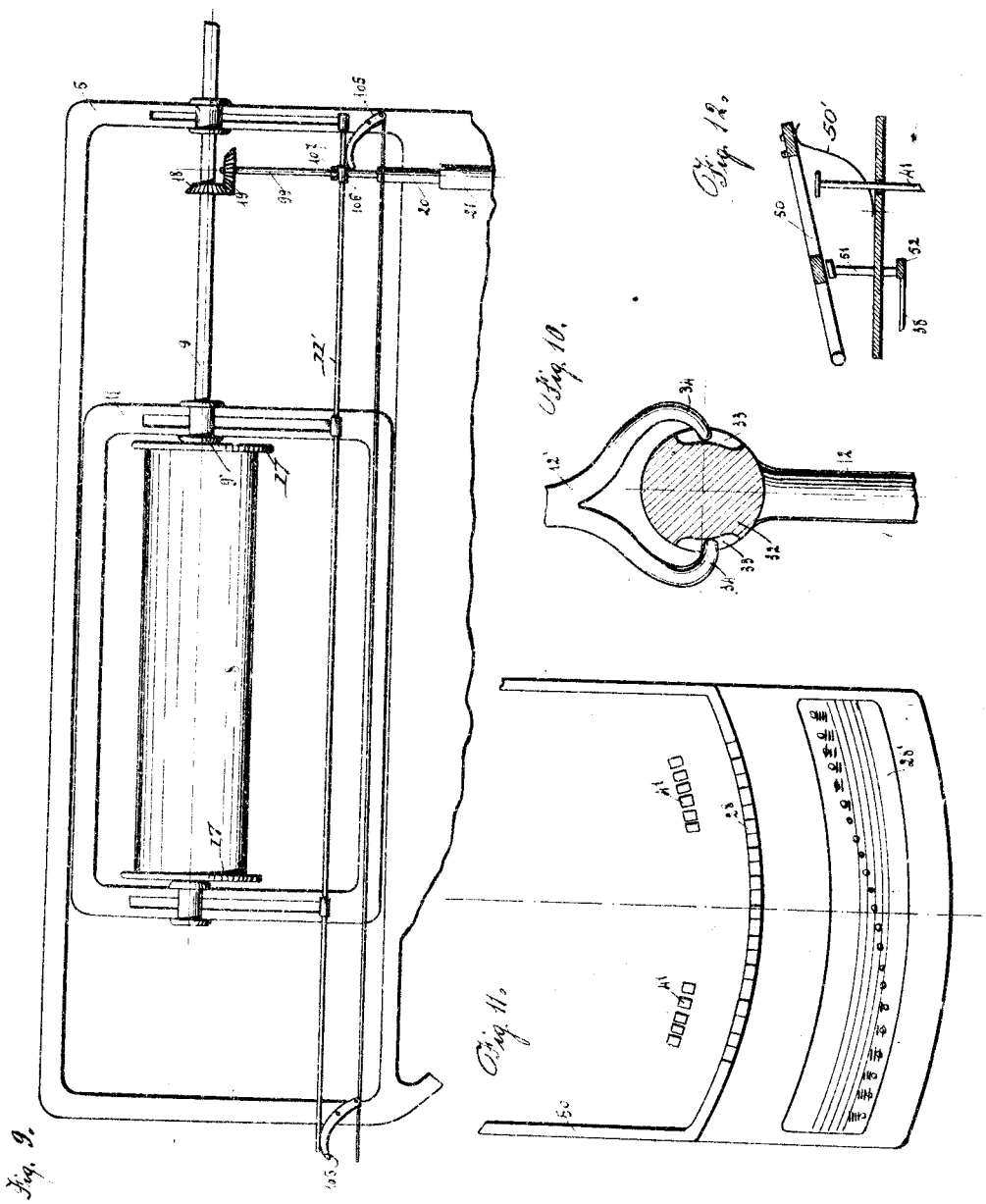

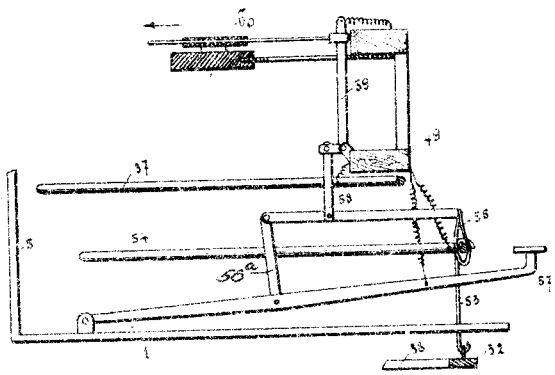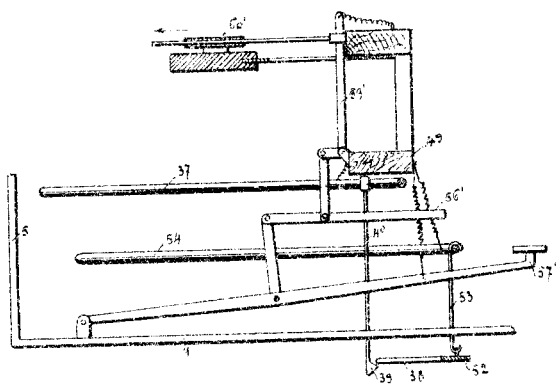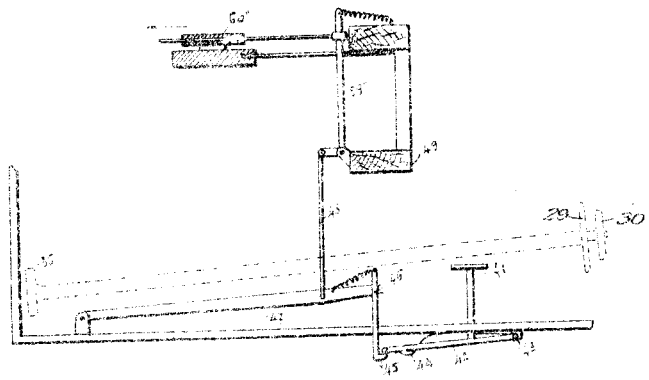

A. FERRETTO.
TYPE WRITER.
APPLICATION FILED JAN. 16, 1912.
1,155,651.
Patented Oct. 5, 1915.
19 SHEETS—SHEET 6.
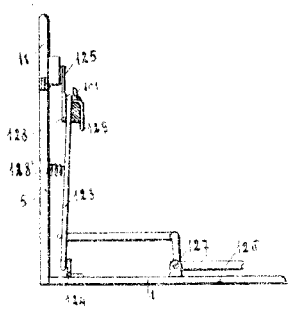
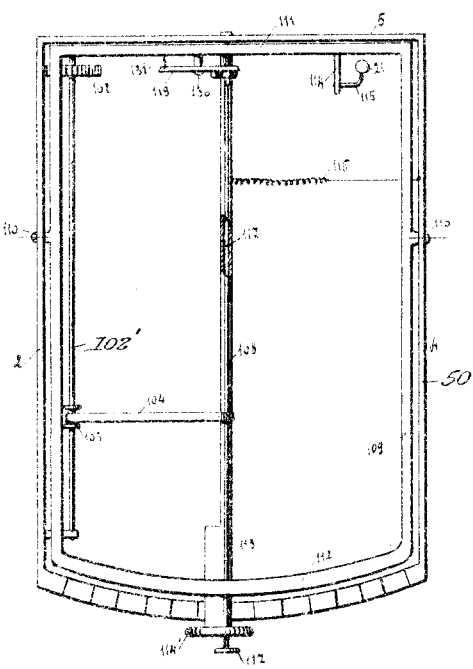

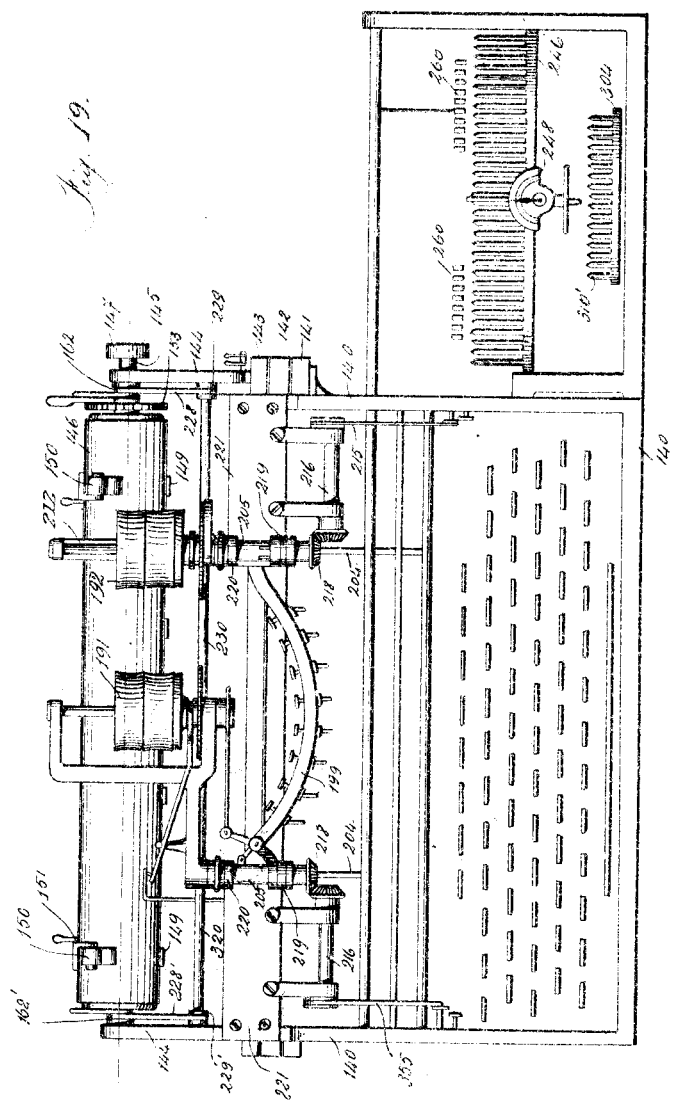

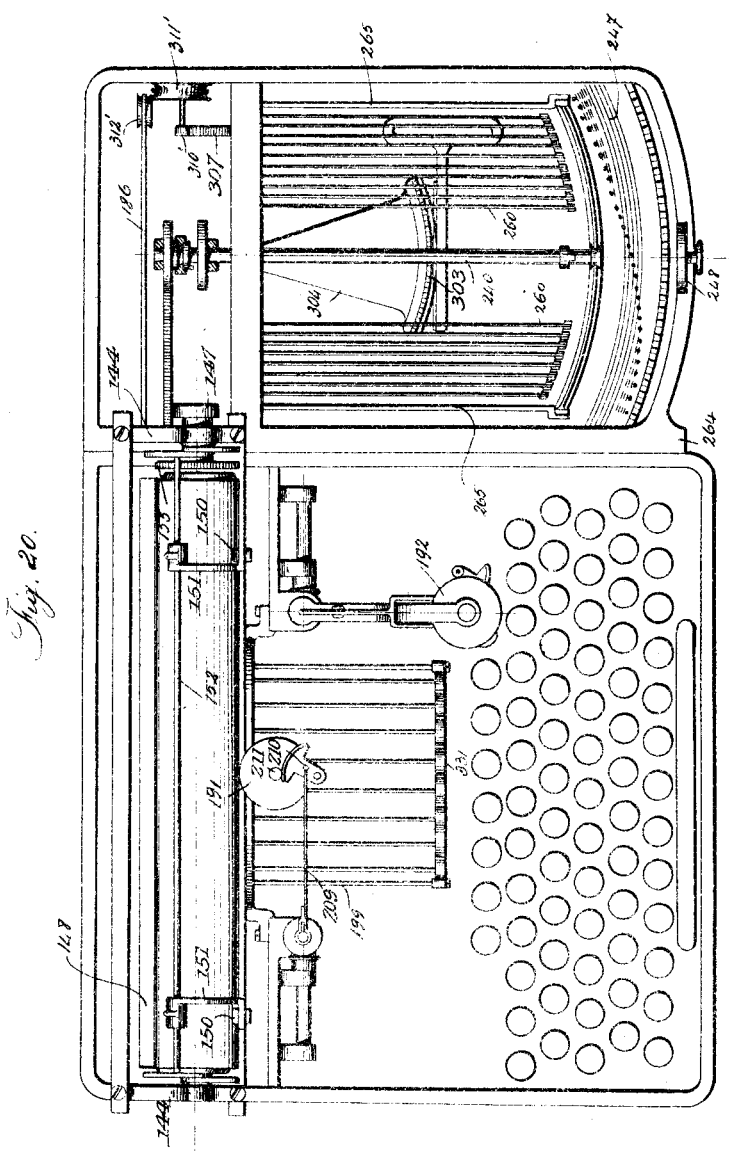

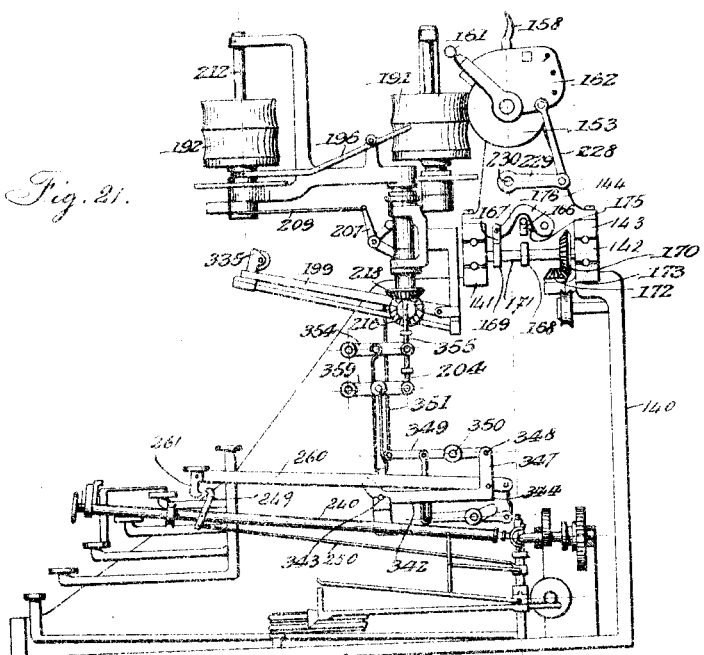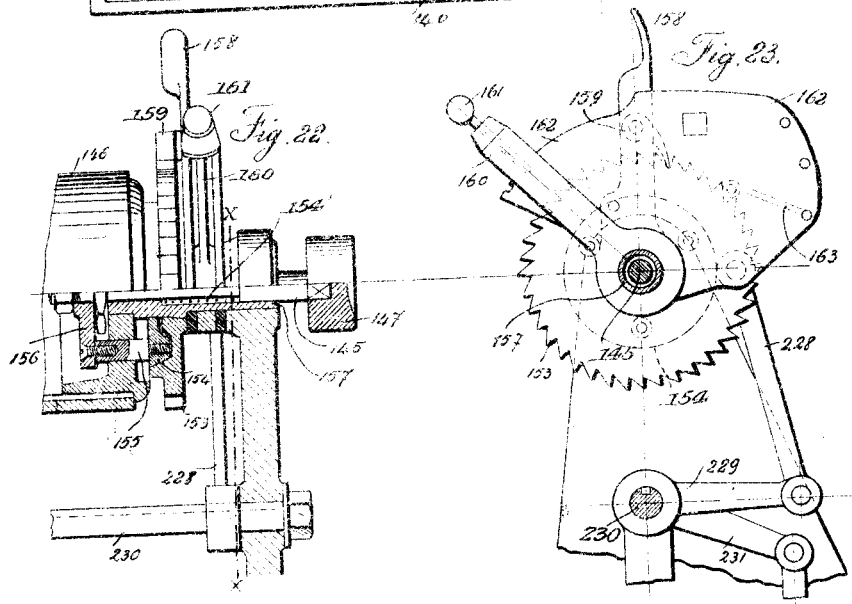

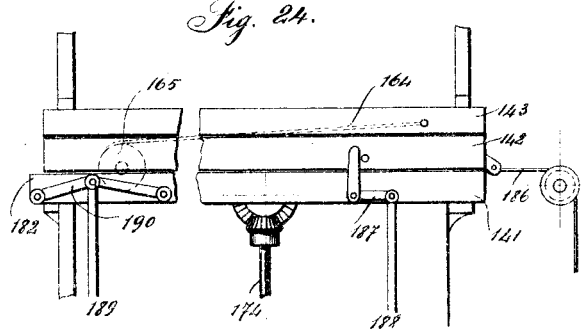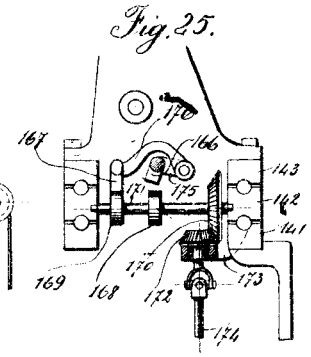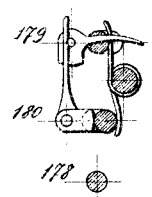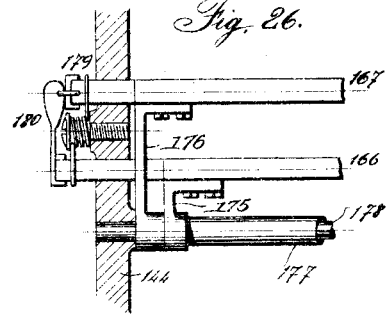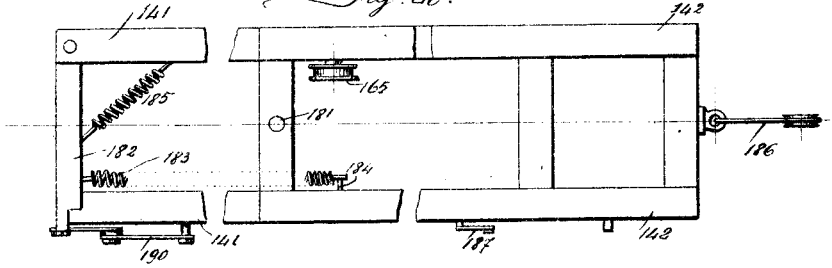

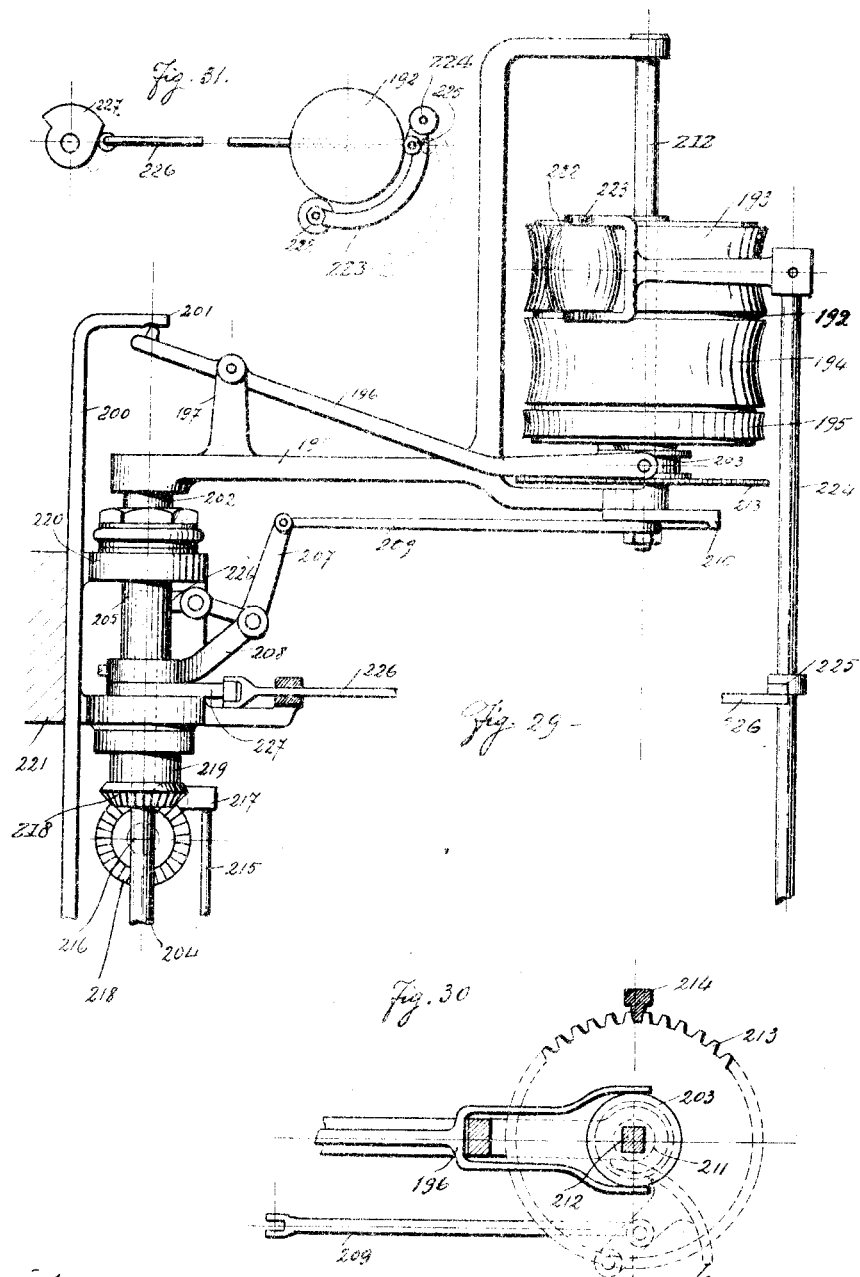

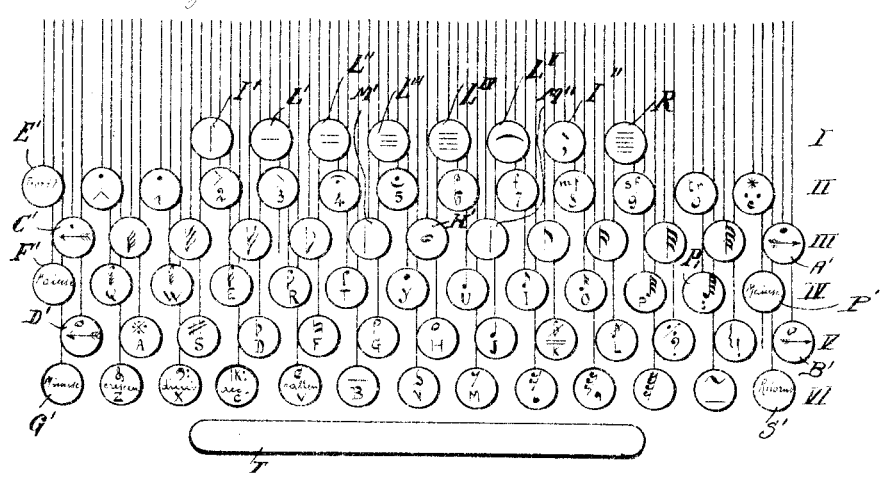
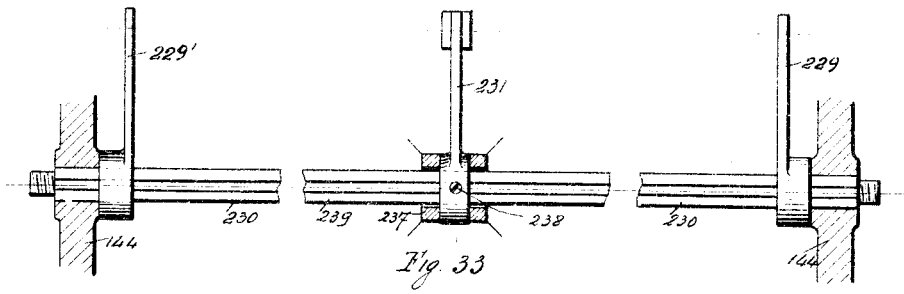
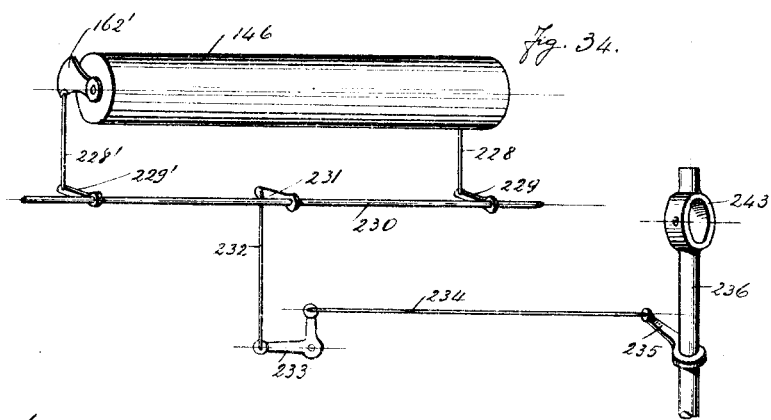

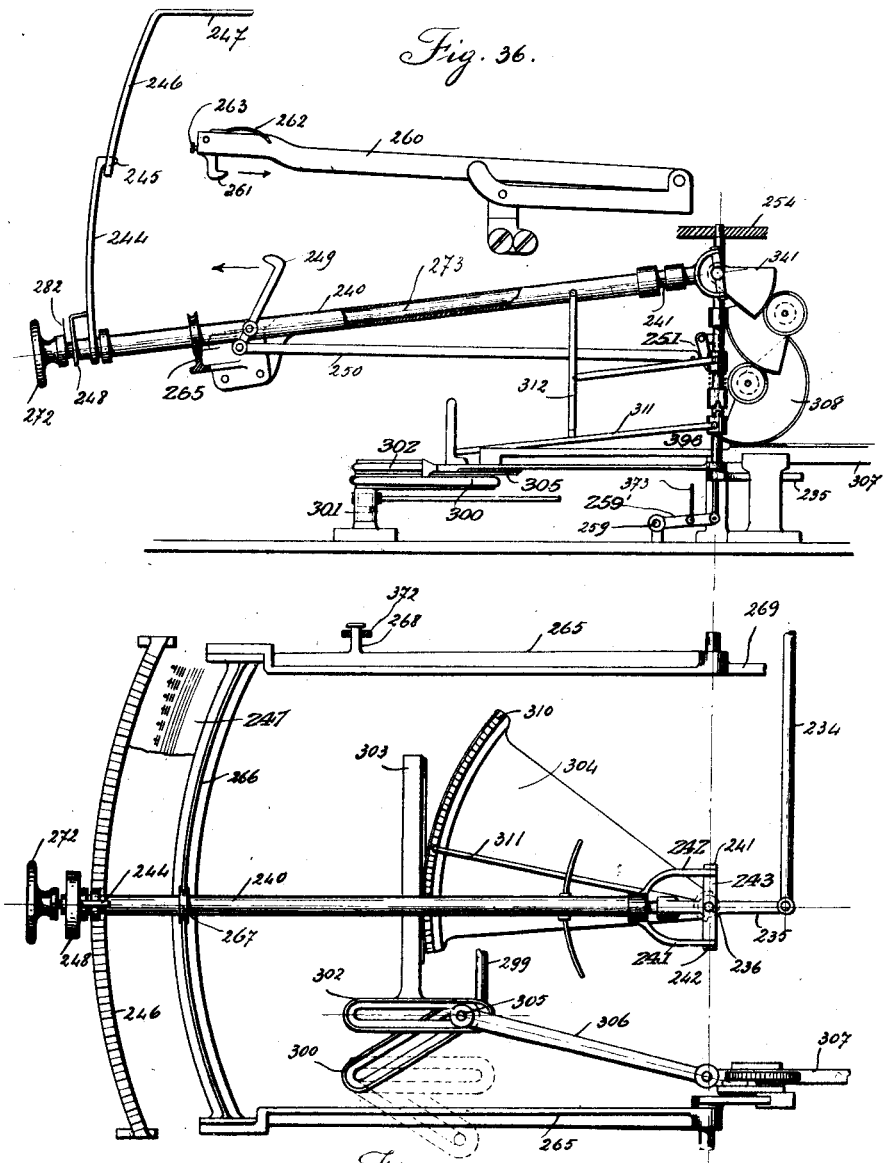

A. FERRETTO.
TYPE WRITER.
APPLICATION FILED JAN. 16, 1912.
1,155,651.
Patented Oct. 5, 1915.
19 SHEETS—SHEET 14.
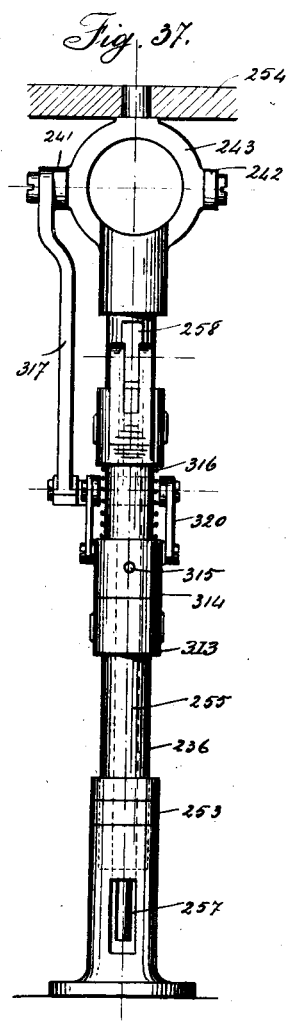
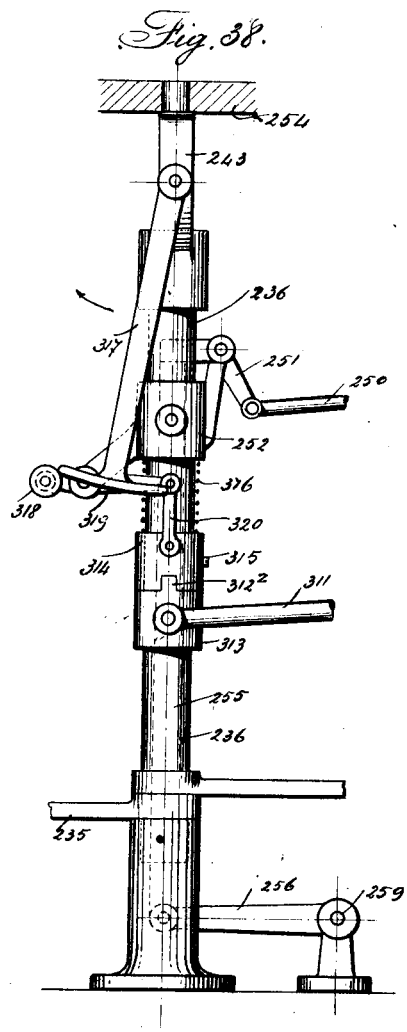

A. FERRETTO.
TYPE WRITER.
APPLICATION FILED JAN. 16, 1912.
1,155,651.
Patented Oct. 5, 1915.
19 SHEETS—SHEET 16.
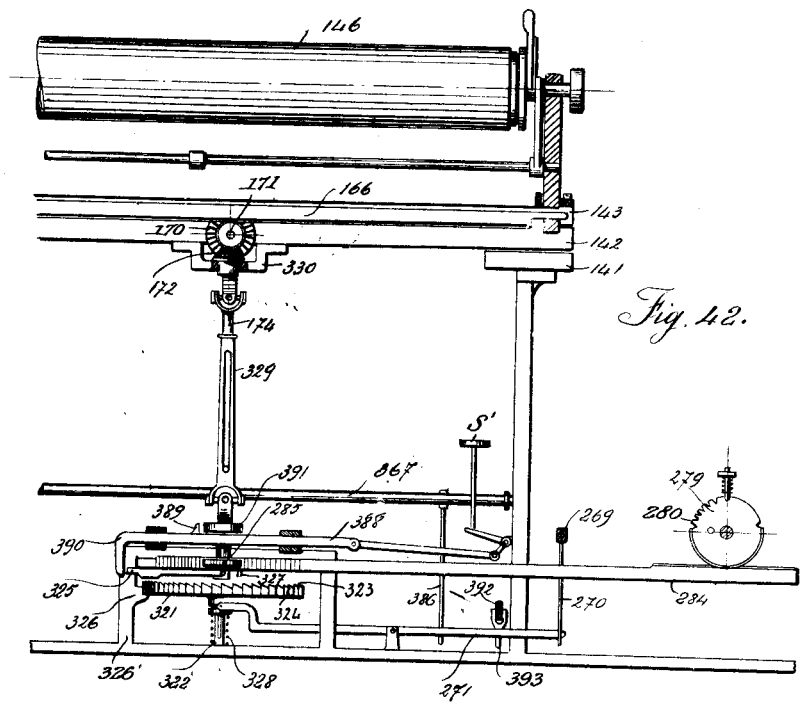
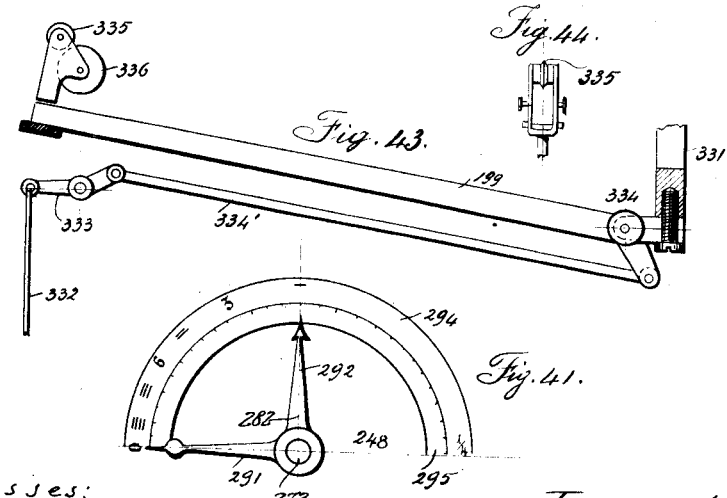
Witnesses:
Olive D. White
Helen S. Morris
Inventor:
Andrea Ferretto
By Emie Bonnelycke
Attorney

A. FERRETTO.
TYPE WRITER.
APPLICATION FILED JAN. 16, 1912.

1,155,651.

Patented Oct. 5, 1915.
19 SHEETS—SHEET 17.

Witnesses:
Olive D. White
Helen S. Morris

Inventor:
Andrea Ferretto
By Emil Bäumelycke
Attorney

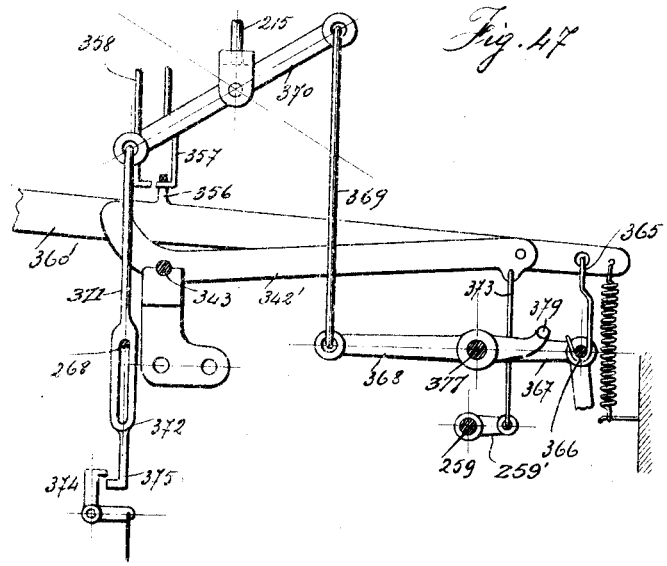
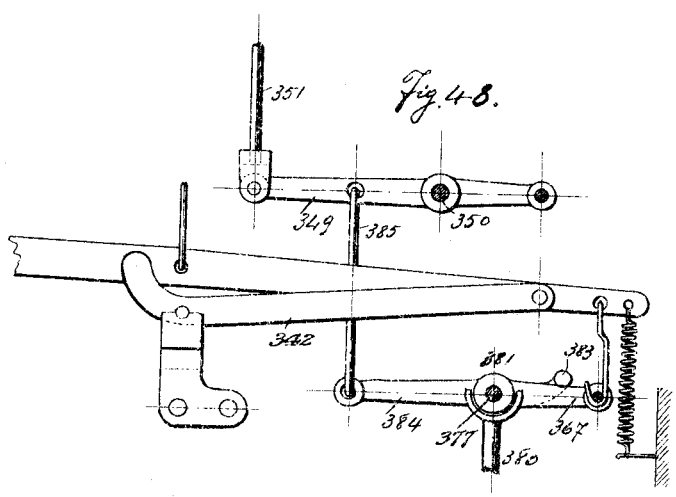

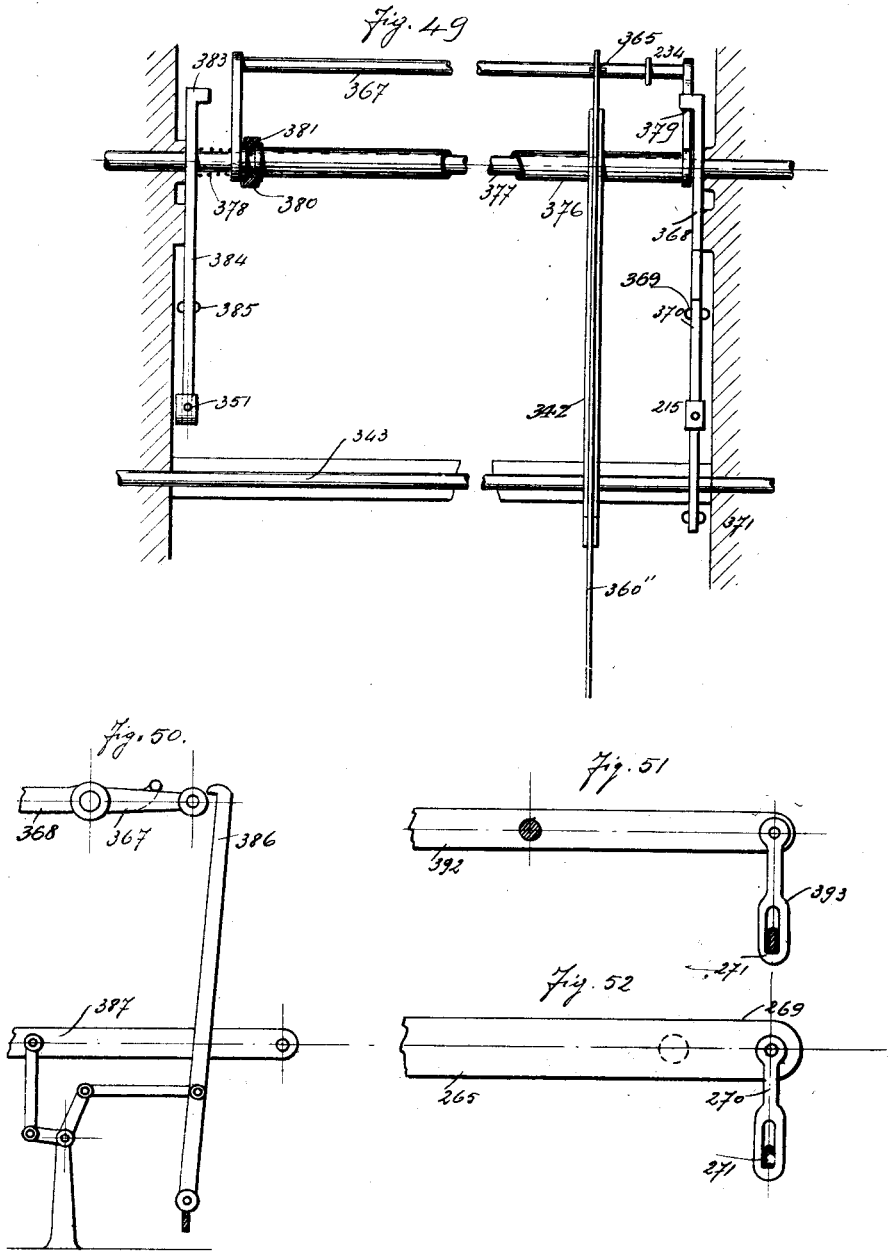

UNITED STATES PATENT OFFICE.

ANDREA FERRETTO, OF MILAN, ITALY.

TYPE-WRITER.

1,155,651.

Specification of Letters Patent.

Patented Oct. 5, 1915.

Application filed January 16, 1912. Serial No. 671,438.

*To all whom it may concern:*

Be it known that I, ANDREA FERRETTO, subject of the King of Italy, resident of No. 4, Via Torchio, Milan, in the Kingdom of Italy, have invented new and useful Improvements in Type-Writers, of which the following is a specification.

The present invention has reference to typewriters, and more particularly to typewriters for writing both musical notes, signs and symbols and the ordinary letters, figures and punctuation marks.

It resides primarily in certain hereinafter described improvements in or relating to the first-mentioned printing devices, the mechanism for actuating the same, and the spacing, and analogous mechanisms directly associated therewith, whereby the machine is rendered more practical and generally efficient, and less cumbersome.

An embodiment of the invention is illustrated in the accompanying drawing, wherein two types of machine are shown, one embodying the ordinary type levers and the other embodying printing drums.

Figure 1:
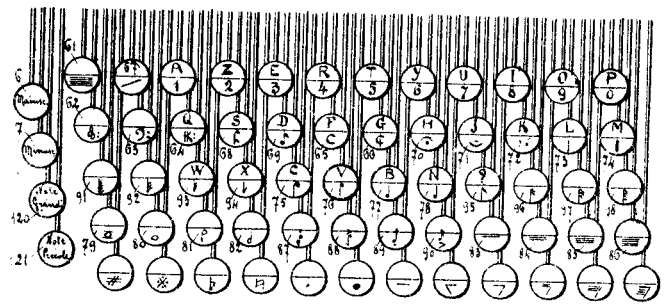
Figure 2:
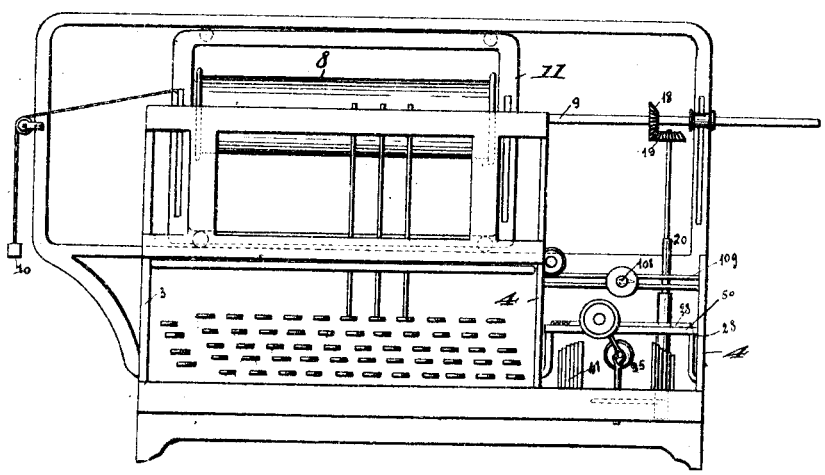
Figure 3:
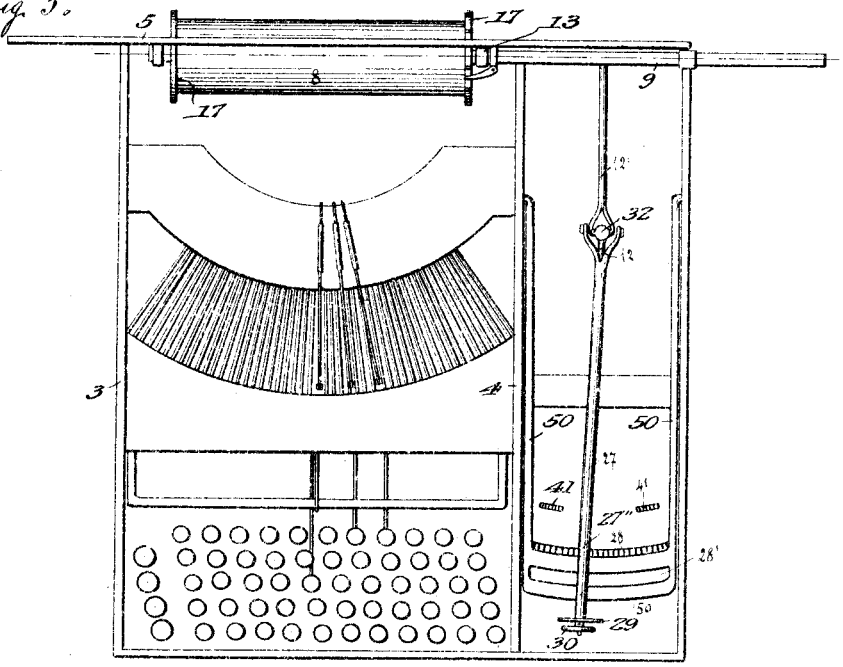
Figure 4:
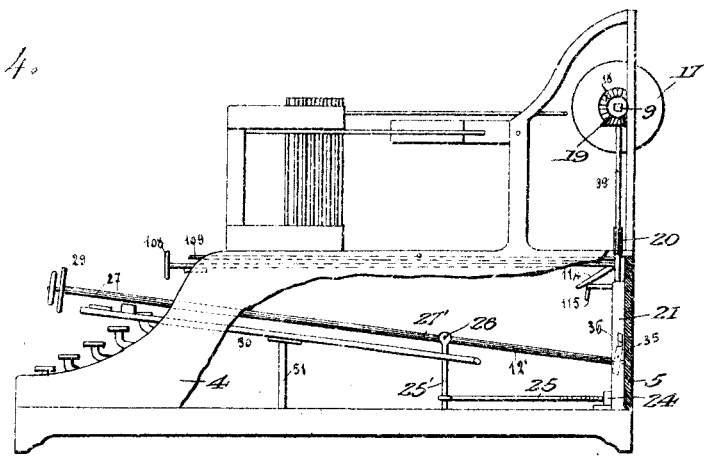
Figure 39:
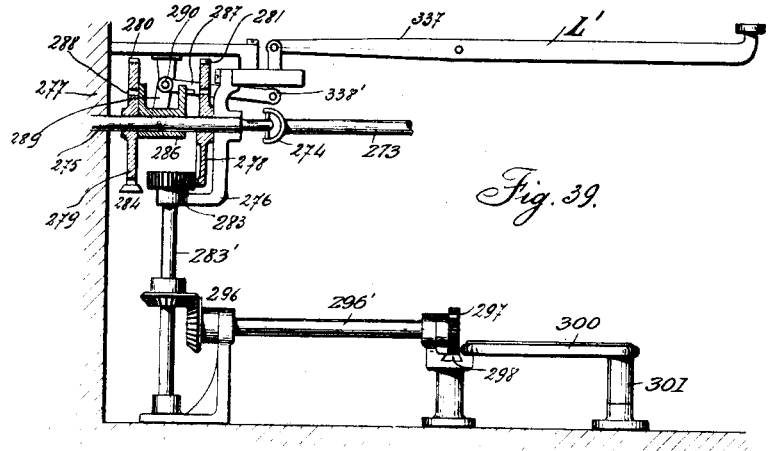
Figure 40:
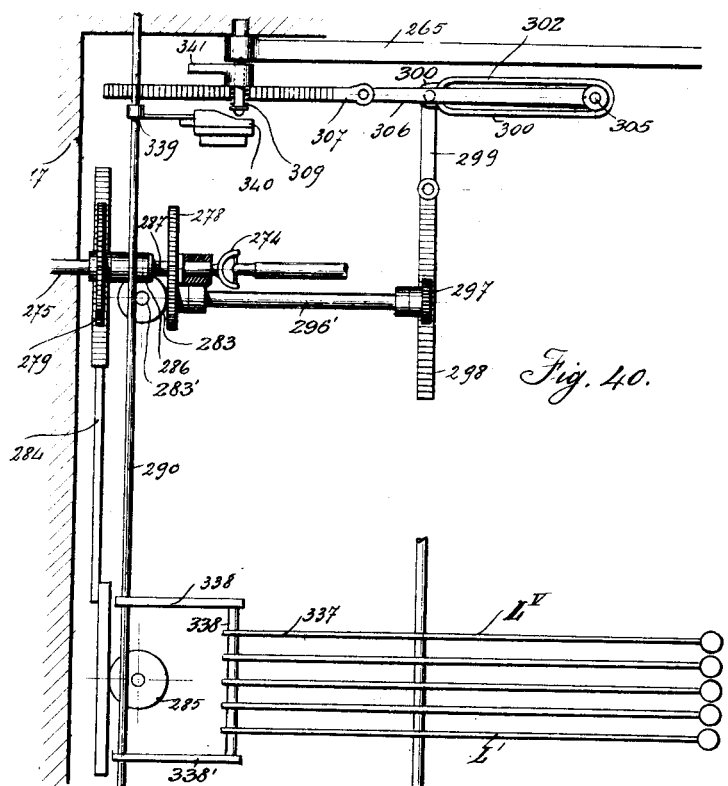

In the said drawing: Figure 1 is a plan view of the key-board of the lever-printing machine; Fig. 2 is a diagrammatic front elevation of said machine; Fig. 3 is a plan view thereof; Fig. 4 is a part-sectional side elevation; Fig. 5 is a transverse vertical sectional view taken through the rear portion of Fig. 3, but with the type-bars and keys omitted; Fig. 6 is a compound side and end elevation of the platen and the rotating means therefor; Figs. 7 and 8, are respectively a part-sectional plan view and a side elevation of the platen-actuator and the transmission devices directly associated therewith; Fig. 9 is an enlarged detail view showing the mounting of the platen and its carriage, and the devices for shifting the former vertically; Fig. 10 is an enlarged plan view of the universal joint provided in the platen-actuator; Fig. 11 is a plan view of the striking frame; Fig. 12 is a longitudinal sectional view of said frame on a reduced scale; Fig. 13 is a part-sectional side elevation of the devices for writing the note heads and musical symbols; Fig. 14 is a similar view of the devices for writing the tail and stem strokes of notes on the staff; Fig. 15 is a similar view of the devices for writing the strokes of notes above or below the staff; Fig. 16 is a side elevation of the devices for regulating the axial or rotary adjustment of the platen according to the length of each note; Fig. 17 is a plan view of the clutch included in the devices shown in Fig. 16; Fig. 18 is a plan view of the devices for rotating the platen to produce the inclined note-connecting strokes; Fig. 19 is a front elevation of the second or drum-printing form of machine; Fig. 20 is a plan view of such machine; Fig. 21 is a side elevation thereof, with the wall of the main frame omitted; Fig. 22 is a view partly in front elevation and partly in vertical section showing the mounting of the platen; Fig. 23 is a vertical section on line X—X, Fig. 22; Fig. 24 is a front elevation representing the mounting of the platen carriage; Fig. 25 is a side elevation of Fig. 24; Figs. 26 and 27 are front and side elevations respectively, of a detail connected with the actuation of the upper member of the carriage; Fig. 28 is a plan view of the lower member of the carriage, with parts broken away to disclose the supporting frame; Fig. 29 is an enlarged side elevation showing the mounting of one of the printing drums, and the associated operating devices; Fig. 30 is a sectional plan view of the devices for displacing the drum axially, and for holding the drum in place during the printing operation; Fig. 31 is a detail plan view of the inking device; Fig. 32 is a plan view of the key-board; Fig. 33 is an enlarged detail view, showing the mounting of the cranks for rotating the platen; Fig. 34 is a perspective view of the lever system connecting the actuator and the aforesaid cranks; Figs. 35 and 36 are, respectively, a plan view and a side elevation, showing the mounting of the actuator and the auxiliary parts; Figs. 37 and 38 are enlarged detail views in front and side elevation, respectively, of the bearing shaft, whereon the actuator is mounted; Figs. 39 and 40 are, respectively, a side elevation and a plan view, showing the actuator-operated mechanism for producing the combined rotary and endwise movement of the platen; Fig. 41 is an enlarged detail view of the transforming scale carried by the actuator; Fig. 42 is a front elevation of the transformer; Fig. 43 is a side elevation of one of the levers carrying the printing wheels; Fig. 44 is a front elevation, showing the mounting of said wheel; Figs. 45 to 48 are enlarged detail views of certain of the key controlled lever systems employed for operating the printing drums; Fig. 49 is a plan view of the systems shown in Figs. 47 and 48; Fig. 50 is a detail view of a further lever system; Figs. 51 and 52 are details of devices connected with the line-spacing key and with the striking frame.

Referring to said drawing, and more particularly to Figs. 1 to 18, 1 indicates, generally, the base or bottom wall of the main frame or casing of the machine; 3, the left-hand side wall; 4, 4 the two right-hand side walls; and 5, the back wall; the parts 3, 4 and 5 being supported by or upon the base, as is customary.

The machine is operated in the ordinary manner for writing words and numbers, and for punctuation, by depression of the proper keys, which latter are controlled by the usual upper and lower case keys 6 and 7, (Fig. 1), the endwise movement of the platen 8 in one direction being effected through the agency of a suitable device, here shown as a weight 10 connected with the carriage 11. The aforesaid platen 8, which is of the usual cylindrical construction, is carried by an axle 9, the greater portion of which is of square section, and rotation of the platen is obtained by means of a clutch connection with said axle, which latter, in turn, is driven from the actuator 12, through the agency of the hereinafter described transmission mechanism. This clutch connection consists, in the present instance, of a collar 13 rigidly secured to axle 9 adjacent one of the disks 17 provided at the ends of the platen, the portion 9' of the axle whereon said platen is directly mounted being of cylindrical section, so as to permit the platen to turn thereon, as will be understood. Collar 13 is provided with a finger 15, to which is pivoted a pawl 14 designed for engagement in the radial notches formed in the above-mentioned disk 17, (Fig. 6), so that rotation of said axle will produce corresponding rotation of the platen. In consequence, since the printing line is fixed, the platen is enabled to rotate through as many steps or spaces as there are notes to be printed below, above, and on the staff, the extent of each of such steps or spaces being equal to half the height of the head of the note.

Rotation of axle 9 is directly produced by means of the transmission mechanism, to which reference has already been made above, in a general way. As shown in Figs. 5 and 9, this mechanism preferably comprises a pair of telescoping shafts or shaft sections 21 and 20, the latter of which is of square section and has a reduced upper portion 99 carrying a bevel gear 19 that meshes with a similar gear 18 mounted to slide on the square portion of said axle. The outer or hollow shaft section 21 has affixed to its lower end an arm 22, (Fig. 7), to which a spring 23 is connected, said spring tending to rotate said shaft, and, consequently, the sliding upper shaft section 20, in a clockwise direction, as indicated by the arrow. This movement of the transmission shaft brings the opposite end of its arm 22 into the path of a horizontal rack 24 which is operated by a gear sector 25 rigidly secured to a vertical bar 25' rotatably mounted in the base 1 of the casing in any desired manner. The upper portion of said bar 25' is forked, as indicated by the numeral 26, the legs of the fork being connected to the legs 27' of a second fork which is formed on the inner end of a sleeve 27. This sleeve is fitted on the actuator 12, which is of rod-like character, as shown in Fig. 7, the outer end of the sleeve being provided with a tooth 27" that is designed for interchangeable engagement with the teeth of an arcuate rack 28 mounted upon the striking frame 50 and referred to more particularly hereinafter.

At its rear end, the actuator rod 12 is formed with a spherical head 32, (Figs. 7 and 10) that is provided, in turn, with a pair of opposed grooves 33, said grooves receiving therein the in-bent terminals of the legs 34 of a fork that is provided upon the front end of a fixed rod 12', which latter constitutes an extension of the main rod 12. This rod 12' is designed for rotation on its longitudinal axis, owing to its connection with rod 12, and it carries at its rear end a pinion 35 which meshes with and shifts a rack bar 36, (Fig. 5).

By reason of the arrangement above described, there is provided, in effect, a universal mounting for the actuator, which enables it to be swung laterally in either direction, in a substantially horizontal plane, about bar 25' as a fulcrum, and which also permits it to be raised and lowered, and to rotate about its own longitudinal axis. The rod 12', however, is capable of rotation only, and is not affected when the actuator is swung sidewise or vertically, nor does the rotation of the actuator affect that of sleeve 27, although the latter obviously participates in the other movements of the actuator. The first, or lateral swinging movement of the actuator serves to effect the rotation of the transmission shaft, through the agency of the parts 25', 25, 24 and 22, which rotation is transmitted, in turn, through the gears 19 and 18 to axle 9 and produces the rotation of the platen necessary to print the note at the proper height. The extent of this movement is regulated by a guide scale 28', (Fig. 11), provided upon the striking frame 50 and arranged concentric with the rack 28, each tooth of which latter corresponds to a note of the natural scale, printed or otherwise indicated upon the guide scale. Moreover, the parts are so adjusted that when the actuator is disposed centrally of rack 28 and scale 28', the axis of the sector 25 will aline with that of the actuator, and, once the staff is printed upon the paper, movement of said actuator to one side or the other will, accordingly, bring the printing line to the proper point on the staff.

A certain number of marks, signs and symbols corresponding to the greater portion of the keys of the key-board, (Fig. 7), may be obtained by striking the proper keys in the usual manner, independently of the actuator and the striking frame. In this way, the printing of the staff lines may be accomplished while the carriage is being returned to its starting point and after the platen has been rotated to properly space the lines, the lever 47, (Fig. 15) being depressed to effect the printing. The types for printing the staff lines, as well as the horizontal or slanting connecting lines occurring in the groups of three, four or more notes hereinafter referred to, may be in the form of small wheels having some suitable inking mechanism associated therewith. When the staff has been printed, the clef sign is printed by striking one of the keys 62 or 63, after which the tempo is written by means of the keys 65 or 66. If the tempo is indicated by two numbers, the keys bearing the corresponding numbers are struck.

As the type bars for printing the letters, marks, signs and symbols may be provided with as many as four different types, it is necessary to shift the platen bodily in its carriage 31 in a vertical direction parallel with its axle, in order to bring the printing line into proper position with respect to the selected type. This movement may be effected through the agency of one or more eccentrics 105, (Fig. 9), worked by three keys 7, 120 and 121, (Fig. 7), the fourth type being so positioned on the head of its bar as to normally strike the printing line. These eccentrics are designed to bear against and raise a horizontal bar 11', (Fig. 9), which is arranged parallel with the carriage 11 and has a sliding connection with the slotted side members thereof, said bar having rigidly connected thereto a collar 106 upon which rests a collar 107 fast on the reduced upper portion 99 of the upper section 20 of the transmission shaft. In consequence, the eccentrics, when operated, will raise bar 11', and the latter, in turn, will lift left shaft section 20, thereby bodily elevating the platen and its axle. As will be understood from Fig. 9 the said axle is likewise slidably connected with the vertically slotted side members of the carriage. Moreover, the telescoping of the shaft section 20 in the section 21 permits the transmission shaft to rotate the platen for any position of the latter.

By depressing the corresponding keys and simply shifting the actuator horizontally, without operating the striking frame, the repeat mark, (key 72), the crowns, (keys 70 and 71), the bar-dividing lines, (keys 73 and 74), the accidentals, dots and pauses, (the bottom row of keys in the key-board), and the marks for staccato notes, (keys 87 to 90), may be printed on the staff at the proper heights.

The second of the several movements of the actuator, i. e., its lowering or downward rocking movement, serves to operate the keys and levers for printing the various sharps, etc., and, conversely, its subsequent upward movement permits the restoration of said parts to normal position. As shown in Fig. 2, the actuator extends forwardly above and across the front portion of the striking frame 50, that frame having the rear ends of its side members pivotally mounted in perforations formed in the outer and inner side walls 4 of the casing, and being normally held in raised position by a spring 50'. When the aforesaid frame 50 is depressed, it strikes against and lowers a vertical key 51, (Fig. 12), connected to a lever 52 which, in turn, is connected to the lower end of a depending link 53, (Figs. 13 and 14). The upper end of this link is connected to a depressible frame 54, and, hence, the downward movement of the former produces a similar movement of the latter. The front member of frame 54 is loosely supported in depending eyelets 55 connected to levers 56, whose rear ends are pivotally connected by depending links 56' with the central portions of the note-printing keys 57, said keys being fulcrumed at their rear ends on base 1. Suitable springs hold said keys 57 and the frame 54 normally elevated. Accordingly, the depression of frame 54, occasioned as above described, will cause its said front member to engage the bottoms of the eyelets 55 and thus hold the front ends of the levers 56 in relatively fixed position, with the result that when a key 57 is depressed immediately afterward, the corresponding lever 56 will be rocked about its front end as a fulcrum and will pull down with it a rod 58, there being a series of these rods which are connected to the spring-controlled bell-crank levers 59 that serve, in turn, to shift the type-bearing bars 60 in the direction of the arrows, (Fig. 13). These levers 59 are fulcrumed at their apices on the frame 49.

Special sets of keys are provided for operation in conjunction with the striking frame to print the ordinary notes on, above or below the staff, (or the small notes, if the platen has been shifted by means of key 121), (keys 75 to 82), or the "appoggiatura" notes, (keys 68 or 69), when the stems of such notes are written with strokes to indicate their lengths; but this applies only to single notes, since the parallel connecting lines used in groups of three, four or more notes of equal length are printed by devices to be subsequently described.

The stem-stroke printing just mentioned is accomplished by adjusting the actuator angularly according to the height of the note to be written, (which adjustment is determinable from scale 28'), and then pressing downwardly upon said actuator, so as to depress the striking frame. At the same time that the actuator is depressed, one key 57' (Fig. 14), of either of the groups indicated by the numerals 91 to 94 or 95 to 98, (Fig. 1), and one key 57 of the group indicated by the numerals 75 to 78, are struck, according as the head of the note is to be turned upward or downward, the first of the two keys struck printing the stem of the note and the strokes thereon, while the second key prints the head of the note. A short interval occurs between the action of the keys 57' and 57, which is produced by the construction depicted in Fig. 14, wherein the lever 52 is shown as having a rearward extension 38 that engages a tooth 39 formed on the lower end of a bar 40. This bar is fulcrumed on an oscillating frame 37, which is depressed consequent upon the downward movement of said bar and, in turn, brings its front member into engagement with the front ends of the levers 56', such engagement taking place before the front member of the afore-mentioned oscillating frame 54 operates to hold the front ends of the levers 56, (Fig. 13), stationary, so that the lever 56' connected with the depressed key 57' will be caused to swing about its front end as a fulcrum, thereby rocking bell-crank lever 59' and actuating type bar 60'.

To mark the strokes upon the heads and stems of the notes which indicate their position above and below the staff, there are provided as many keys 41, (Figs. 12 and 15), as there are such notes indicated upon the guide scale 28'. When the actuator is adjusted to correspond to one of these notes, and is lowered to depress the striking frame, it will also depress one of said keys, each of which latter, as shown in Fig. 15, is connected to a lever 42 pivoted at its front end 43 to the lower surface of base 1 and normally held in raised position by a spring 44. At its rear end, lever 42 is engaged with the toothed lower end of a bar 45 that is pivoted adjacent its upper end at 46 to the key lever 47, so that the rocking movement imparted to lever 42 by the depression of a key 41, will be transmitted to lever 47 and thence to bell-crank lever 59'', the latter, in turn operating type bar 60'', which prints the stroke or strokes according to the pitch of the note. The arrangement of parts is such that the movement of type-bar 60'' commences slightly in advance of the movements of the type-bars 60 and 60' produced by the depression of the afore-mentioned pair of keys 57' and 57.

The two previously described main movements of the actuator are employed to effect the rotation of the platen and the operation of the various printing levers. Its third main movement, (i. e., rotation about its longitudinal axis), is utilized to effect the endwise movement of the platen carriage in accordance with the length of each note to be written. For this purpose a unit length of displacement, or step, is chosen corresponding to the shortest note to be written, for instance the "sixty-fourth" or hemi-demi-semi quaver, and the displacements for the carriage corresponding to the demi-semi-quavers, or "thirty-seconds", the semi-quavers, or "sixteenth", the quavers, or "eighths", and the crochets, or quarter notes are determined as multiples of such unit movement, according to the known and relative lengths of these notes.

The rotary movement just referred to is obtained by turning a small hand wheel 30, (Fig. 7), affixed to the front end of the actuator rod 12, adjacent which wheel is located a pointer or indicator 31, also fast on said rod, that travels over a disk 29 secured to the front end of sleeve 27, said disk being marked in correspondence with the lengths of the notes. Rotation of the actuator serves to impart a movement of proportionate length to the rack 36, as will be understood, the movement of the rack being transmitted to a horizontal bar 122 (Fig. 5), with which it is connected through the agency of the lever 121.

Adjacent the rear wall 5 of the casing is arranged a vertical plate 123, (Figs. 5 and 16), which has a hinge or pivotal connection 124 at its lower end with the base 1 and carries at its upper end a slotted bolt 129 that is disposed in the path of bar 122 and is normally drawn toward the same by a spring 100. This bolt is arranged against the front face of plate 123 and is provided with an upstanding tooth 101 that is caused to engage a rack bar 125, secured to the bottom of the carriage 11, by means of a retractile spring 128' interposed between wall 5 and plate 123 and tending to draw the latter toward the former. To the rear face of said plate is fixed a second upstanding tooth 128, which is also adapted to engage rack 125, but which, however, is normally held out of such engagement by the action of the afore-mentioned spring 128'. Plate 123 is engaged, adjacent its lower end, by a Z-shaped lever 126, which is fulcrumed at 127 on base 1, and which has its front portion so positioned beneath the striking frame 50, that depression of said frame by the actuator will produce a rocking movement of said lever, with the result that plate 123 is caused to swing forward into substantially the plane of rack 125, thereby disengaging tooth 101 from, and engaging tooth 128 with, said rack. This engagement of tooth 128 with rack 125 takes place, as will be understood, when the striking frame is depressed to print a note, and it serves to hold carriage 11 steady while the note is being printed. At the same time, bolt 129 is pulled forward by spring 100 until it strikes the adjacent end of bar 122, which latter has previously been adjusted by the rotation of the actuator, so that the bolt tooth 101 will have moved a distance relative to the rack which corresponds to the displacement of said bar and, therefore, to the length of the note being printed. When the striking frame is released, spring 128' will pull plate 128 back toward wall 5, thereby disengaging tooth 101 from and engaging tooth 128 with rack 125, and since the tension exerted by weight 16 upon the carriage is greater than that exerted by spring 100 upon bolt 129, said carriage will be moved toward the left a distance equal to the previous movement of said bolt toward the right. Therefore, the carriage is moved to the left, after each note is struck, a distance corresponding to the length of such note.

In writing chords having superposed notes, it will suffice to set the indicator 31 for no displacement, so that after the first note of the chord has been printed, the carriage will remain stationary during the printing of the remaining notes. When the chord consists of notes having side heads, the first note to be struck may be given a length corresponding to the minimum displacement (1/64), after which the remaining notes may be printed.

When groups of three, four or more notes of the same length are to be written, a supplemental platen-shifting device is used, such device, as shown in Fig. 18, consisting primarily of a frame 109 which is used in connection with one of the parallel-stroke keys 83 to 86 and with a lever 108. This frame is located above the main striking frame 50, and its side members are furnished with trunnions 110 whereon it rocks, said trunnions fitting in openings provided therefor in the right-hand side walls 4, 4. Lever 108 is disposed beneath said frame and extends beyond the rear and front cross-pieces 111 and 112 thereof, its rear end having a universal connection with wall 5 which enables it to swing in a horizontal plane and, also, to rotate upon its longitudinal axis. The front portion of said lever is provided with a cam-like enlargement 113 which comes with cross-piece 112 and terminates in a hand wheel 114', rotation of which latter serves to rock frame 109 upon its trunnions. Cross-piece 111 has connected thereto a curved arm 114 which engages a similar arm 115 fastened to the lower section 24 of the transmission shaft, so that the rocking of frame 109 produced in the manner stated will operate, in turn, a rotation of the transmission shaft, which will effect rotation of the platen. Such movement, however, is imparted to the platen, independently of the actuator and its associated parts 25, 24 and 22, since care must be taken to move the actuator far enough to the right to engage tooth 23' in an adjoining notch, thus releasing the part 24 and of range of the part 22. At the same time that the rotation of the platen is effected, it is necessary to shift the carriage, as will be understood, and this may be accomplished by connecting lever 108 to a shaft 102' which, in turn, is provided with a pinion 102 that meshes with rack 125, such connection being obtained by means of a band 103 that is attached at one end to said lever and at the other end to a spool 105 fastened to said shaft, said band being wound on and unwound from said spool when the lever is shifted horizontally.

To withdraw tooth 101 from rack 125, there is preferably provided a cord or cable 131 which is connected at one end to bolt 129, and at the other end to a lever 119 that is rocked in a horizontal plane on a pivot 130, said cord being trained over suitable pulleys, as shown in Fig. 5. Lever 119 is operated by endwise movement of a rod 117, (Fig. 18), which fits in the bore of lever 108 and terminates at its front end in a head or handle 117'. In consequence of this construction, the carriage can be shifted in either direction, after one of the aforementioned keys has been depressed and rod 117 has been actuated to release rack 125, by swinging lever 108 toward the right or left, thus producing the parallel connecting strokes, and if, at the same time, said lever be rotated, these strokes may be inclined in either direction, owing to the revolution of the platen. Similarly, the arched "legatura" marks, and the forked "crescendo" and "diminuendo" marks may be written, as will be understood, a suitable spring 116 returning the lever 108 to its neutral position represented in Fig. 18. "Colorito," "decrescendo" and "accelerando" notations, and the words of the composition, are printed in the usual manner by the proper type keys.

Where greater compactness is desired, the type bars may be replaced by printing drums, equipped with the proper type characters. These drums may be operated through the agency of the type keys alone, or in connection with the actuator, a machine embodying these characteristics being depicted in Figs. 19 to 52, to which reference will now be had. The functions of the main parts comprehended in the preceding form of the invention are assigned, in the modified form now under consideration, to a two part platen carriage, a pair of type-bearing drums, an actuator, a device for transforming the lengths of time of the notes to be written into corresponding lengths of space, and a key-board. Some additional operations are obtained from the coöperation of certain of the afore-mentioned parts, as hereinafter fully explained. In said figures, 140 indicates, generally, the casing of the machine, whereon is rigidly supported a horizontal frame 141, (Figs. 19, 24, 24 and 25), which, in turn, supports the upper and lower members 143 and 142 of the two-part carriage for the platen 146, suitable anti-friction bearings being interposed between the said members 143 and 142, and between the latter and the said frame 141. Members 143 and 142 are likewise in the form of horizontal frames, the lower member 142 being rigidly connected to upstanding brackets 144 wherein the platen axle or shaft 145 is journaled, said axle being provided with a nut 147 to permit hand-control of the platen when desired.

Behind the platen is disposed a paper guide 148, preferably in the form of a plate, which carries a series of small presser wheels 149 and holds them tightly against the platen. These wheels frictionally engage the sheet of paper and keep it taut, in a sense, the said sheet being also engaged by a pair of similar wheels 150 that are adjustable longitudinally of a rod 152 connected at its ends to the supporting brackets 144. The wheels 150 are carried by small brackets 151 that are slidably mounted on the rod 152.

Platen 146 has arranged at one end thereof a ratchet 153, (Figs. 22 and 23) which is loosely mounted upon a sleeve 157 slidably fitted upon axle 145. Said ratchet is normally engaged with a toothed clutch disk 154 that is pressed toward the same by a spring 154' located interiorly of said sleeve, this disk being connected by pins 155 to a second disk 156 securely mounted within the platen upon said axle. During the time that the parts 153 and 154 are coupled together, rotation of the former will effect rotation of the platen, as will be apparent, but these parts may be readily uncoupled by pushing axle 145 inwardly. In order to turn the platen through the angle corresponding to the fixed space maintained between the staffs, a lever 158 is loosely fulcrumed upon sleeve 157, and is provided with a pawl 159 adapted to engage ratchet 153 and rotate it a distance of one, two or three teeth, according to the angular displacement of a lever 160 equipped with a slidable, weighted detent 161. This detent may be adjusted for interchangeable engagement in the peripheral notches formed in a segment 162, which latter is connected with ratchet 153 to prevent displacement of the platen, by means of a clutch 163, here shown as constituted by a spring finger secured at one end to said segment and carrying at its other end a small roller that engages the teeth of the ratchet.

The upper frame 143 of the carriage is adapted to slide from right to left with the platen, as in ordinary typewriters, it being drawn in that direction by reason of the connection to it of one end of a coil spring 164, which is wound in a roller 165 journaled in the rear bar of the lower carriage frame 142, (Figs. 24 and 28). Its movement may be regulated by means of a pair of parallel rack bars 166 and 167, (Fig. 25), carried respectively, by arms 175 and 176 and respectively engaging pinions 168 and 169. Both pinions are mounted upon a cross-shaft 171 which is journaled at its ends in the central portions of the bars of frame 142, and carries a bevel gear 170 that meshes with and is driven by a smaller bevel gear 172, the last-named gear being supported by a bracket 173, connected to the rear bar of said frame 142, and mounted on a shaft 174 having a double universal joint. This shaft extends to the transforming device. The two afore-mentioned pinions 168 and 169 are of different diameters, and hence the larger pinion 168 will impart a movement of greater length to the rack 166, for a given movement of gear 170, than will be imparted by pinion 169 to rack 167. The former pinion is used where the music to be copied is written in "even" time, and the latter pinion where the music is written in "odd" time. The arms 175 and 176, which carry said racks, are secured to a pair of nested shafts 177 and 178, (Figs. 26 and 27), journaled in the supporting brackets 144, and from one of said brackets, in the present case, the right-hand one, project a pair of levers 179 and 180 which are connected to said racks for the purpose of disengaging one or the other of them from the corresponding pinion.

The lower carriage frame 142, (Figs. 24 and 28) is designed to move either to the right or to the left. Normally, however, it is drawn toward the left by a spiral spring 183, connected at one end to a projection 184 fixed to its front bar, and at the other end to a lever 182, which lever is pivoted at its rear end to the rear bar of the fixed frame 141, is caused to engage the front bar of that frame, at its front end, by a spring 185, and is normally engaged by a depending pin 181 carried by the frame 142. The movement of frame 142 toward the right is obtained, ordinarily, by means of a cable, cord or similar flexible element 186 connected with the actuator, but the same movement may be obtained through the agency of a lever 187, operative by a vertical rod 188, which latter, in turn, is operated by the keys A', B', of the key-board, (Fig. 32). In either instance, spring 183 effects the return movement of the frame. Movement of said frame 142 to the left is produced by depressing the keys C' D' of said key-board, these keys being operatively connected with rod 189 which, in turn, actuates a toggle 190 that is connected to lever 182 and to the front bar of frame 141, spreading of the toggle serving to move lever 182 outwardly or to the left and, hence, to draw frame 142 in the same direction by means of spring 182. The various movements of the lower frame are transmitted to the upper frame, and thence to the platen, so that displacement of the latter either to the right or to the left, and its automatic return to its former position are insured.

The printing of the musical signs on the paper carried by the platen is effected by means of the two type drums 191 and 192, and the wheel-bearing levers 193, (Figs. 19 and 29). The operation of both drums is precisely the same, and accordingly a description of one, (for instance the drum 192), will suffice for both. Each drum has its peripheral wall furnished with three superposed, annular bands, numbered in Fig. 29, (for the drum 192), 193, 194 and 195, on each of which bands the type characters are arranged in a circular row, the selection of the type for the bands of each drum being according to any desired system. Each drum must be capable of vertical axial displacement, of axial rotation, and of lateral movement into contact with the platen.

The axial displacement of the drum enables the band containing the letter, note, or other character selected to be brought opposite the printing line, and is effected, in the construction represented in Fig. 29, by a rocking lever 196 having a forked portion which engages a grooved collar 203 slidably mounted on the vertical drum shaft 212 and connected to the drum itself, said lever being fulcrumed upon an upstanding lug 197 provided upon the arm of a main or supporting yoke 198, in whose arms the aforesaid shaft 212 is journaled. Lever 196 is rocked by the depression of a vertical rod 200, which is actuated from certain keys, (for instance, the keys E', F', and G'), and has a lateral extension at its upper end for engagement with the adjacent end of said lever, the point at which such engagement takes place being in line with the axis of the sleeve 205 to which yoke 198 is fixed. In this way the hereinafter described swinging movement of said yoke is permitted to take place without interfering with the actuation of lever 196.

Assuming that the drum has been shifted vertically, to bring the band containing the selected type character opposite the printing line, it then becomes necessary to rotate the drum upon its axis, in order to bring the character itself into printing position. This may be accomplished through the agency of a depressible vertical rod 204 that extends upwardly through sleeve 205 and is provided with a nose 206 which projects through a vertical slot in said sleeve and is pivoted to the adjacent arm of a bell-crank lever 207. Said lever is fulcrumed at its apex on a bracket 208 connected to said sleeve and has its other arm connected by a rod 209 to a gear sector 210, (Fig. 30), which meshes with a gear 211 keyed upon the drum shaft. Rod 204 is worked from the key-board and, when depressed, rocks lever 207 upon its fulcrum, thus effecting the required rotation of shaft 212. To hold the drum in position during the printing operation, said shaft 212 may be provided with a stop wheel 213, which is engaged precisely at the moment when the printing takes place by a tooth 214 fixed to the casing of the machine, said tooth entering the space or notch in said wheel corresponding to the character to be printed.

The third action, which must be accomplished by the type drum during the printing operation, is its movement from a position of rest, wherein the yoke 198 is perpendicular to the platen, to a position of work, wherein said arm and platen are parallel. Moreover, the operating parts must be so timed that before the drum strikes the platen, the drum must have been adjusted to bring the selected type into printing position. This movement is produced by means of a rod 215, (Figs. 19 and 20), which is connected at one end to a lever 216, (Fig. 17), operated by a lateral projection 216' on the hereinafter described striking frame 205 operated by the actuator, and at the other end to a crank 217 on the shaft 216, the latter having a gear connection 218 with sleeve 205. Said sleeve is journaled and supported in suitable bearings 219 and 220, connected to the cross-piece 221, and is thus caused to rotate with shaft 216, its rotation having the effect of swinging bracket 198 and the drum from one position to the other.

The inking of the types takes place during the time that the drum moves into printing position, and is produced by means of a felt wheel 222, (Figs. 29 and 31), mounted between the arms of a fork 223, which is connected to the upper end of a vertical shaft 224. This shaft carries a crank 225, to which is connected a rod 226 whose opposite end is engaged by a cam 227, fast on sleeve 205, the arrangement being such that when the drum swings into working position, it will come into contact with the inking roller and be wiped thereby, and will push said roller into the dotted line position depicted in Fig. 31. The action of the cam on shaft 224 will tend to maintain the roller in this position until after the drum has returned to its normal position.

The rotation of the platen upon its axis is carried out for the same purpose as in the construction first-described, namely to print the notes at the proper heights upon the staff. To obtain this rotation, the two segments 162 and 162', (Figs. 19, 22 and 23), which are loose on the corresponding sleeves 157, are connected by rods 228 and 228', to cranks 229 and 229' rigidly attached to a horizontal shaft 230, (Figs. 33 and 34). Said shaft 230 has a third crank 231 fastened thereto, which crank is connected by a rod 232 to a bell-crank lever 233 that is joined by a rod 234 to an arm 235, fast on a vertical shaft 236. Shaft 236 is rotated from the actuator, as hereinafter explained, and constitutes a bearing post or fulcrum similar in its main purpose to the bar 25' in the first form of the invention. As shaft 230 has its ends journaled in the upright supporting brackets 144 carried by the upper frame 143 of the carriage, it must necessarily travel with said frame, wherefore crank 231 has a pin-and-groove connection 238, 239 with said shaft, and is itself held against displacement by a retaining fork or yoke 237 which is secured to the casing, and through which the shaft also slides. (See Fig. 33.)

The actuator, in this form of the invention, possesses all of the functions of the corresponding element in the first form and, in addition, those of the auxiliary actuator 108. Generally speaking, therefore, it serves to effect the rotation of the platen, thus controlling the printing of a note at the proper height on the staff; to effect the movement of translation of the carriage frame 142 to the right: to control the operation of the keys, for the purpose of writing the notes, signs etc.; to effect at each stroke a movement of the carriage corresponding in length to the length of each note; and to determine the degree of inclination of the connecting lines used in writing groups of notes of the same length. The first of these operations is effected, as before, by swinging the actuator in a substantially horizontal plane; the second and third, by depressing it; and the fourth and fifth by rotating it about its longitudinal axis. The said actuator, which is shown in Figs. 35 and 36 in its depressed position is disposed in a frame at the side of the platen, constituted by a lateral extension of the main casing. It comprises the rod or spindle 273. (Fig. 36), and the sleeve 240, wherein the same is loosely fitted, said sleeve having the horizontal arms 241 and 242 of its forked rear end pivoted to a pair of diametrically-opposite pins provided upon a ring 243, (Figs. 34, 37 and 38) that forms an integral part of shaft 236. That shaft is journaled at its lower end in a vertical socket 253 and at its upper end in a bearing opening in a cross-bar 254, and, as already stated, is operatively connected with platen 146 by means of the device represented in Fig. 34. By reason of this construction, lateral swinging movement of the actuator in either direction will result in a corresponding rotary movement of said platen, the aforesaid swinging movement being regulated by the guide scale 247 provided upon a horizontal plate located at the top of a comb 246, each space in which comb corresponds to one of the notes in the natural scale marked on the said guide scale. The indicator 244 which coacts with this comb, and hence, with the guide scale is fastened to sleeve 240, and is provided at its upper end with a nose 245 that may be caused to enter into any one of the comb slots by depressing the actuator.

The above mentioned bearing shaft 236, (Fig. 37), is hollow, and it contains an endwise movable rod 255 whose upper end abuts against one arm of a bell-crank 251, and whose lower end is pivoted to a horizontal arm 256 that is fixed to a shaft 259 and projects into socket 253 through a vertical slot 257 formed therein. The aforesaid bell-crank arm projects into shaft 236 through a similar slot 258, and its other arm is connected by a rod 250 to the lower end of a hook 249, (Fig. 36) that is pivoted to sleeve 240, said bell-crank being fulcrumed at its apex upon the arm of a collar 252, secured to shaft 236. Shaft 259 is operated through the agency of the keys, as hereinafter described, and, when rocked, clockwise, (Fig. 38) raises rod 255, thus rocking bell-crank 251 in the same direction and, in consequence, swinging hook 249 forwardly.

Above the actuator are arranged two series of levers 260, the series to the left of the actuator consisting of eight, and that to the right thereof of ten levers. These levers, which serve to effect the printing of the strokes across the heads and stems of the notes above and below the staff, are each provided with a nose 261, engageable by the hook 249 so that when such engagement is effected, depression of the actuator will serve to also depress the lever to which said hook is coupled. Said noses are pivotally mounted in the ends of the levers, are normally forced to swing toward the rear of the machine through the agency of springs 262, (Fig. 36) and are rendered adjustable by means of screws 263. In the normal positions of the actuator and the levers 260, the hook 249 is clear of the lever noses, to permit the swinging movement of the actuator, but when any one of the keys of the keyboard controlling the note types on the printing drums is depressed, its connection with shaft 259 will rock that shaft and thus swing said hook into engagement with the lever beneath which it has been moved. Depression of the actuator will then cause the lever with which it is then coupled to move downward with it. During this movement of the actuator, however, the angular arrangement of rod 250 relative to the latter and its connection with bell-crank 251 will cause said rod to move forwardly, thereby rocking hook 249 out of engagement with the lever nose, whereupon the uncoupled lever will return to its original position, the parts being so proportioned that this uncoupling takes place when the actuator reaches the middle of its downward stroke or movement. All of said levers are connected to the left-hand printing drum 191, and during the return movement of a lever which takes place during the second half of the stroke of the actuator, it will have operated said drum to print the requisite number of strokes upon the paper. The head of the note is printed by means of the striking frame 265, after the strokes have been printed, this frame having a pivotal mounting similar to the corresponding frame in the first form and being normally elevated through the agency of suitable springs (not shown). At its front end, said frame carries an arcuate rail 266 (Fig. 35), engageable by a roller 267 mounted on sleeve 240.

The carriage member or frame 143, which directly supports the platen, is designed to travel a distance which is determined by means of a sector 248, connected to sleeve 240 and marked with two concentric semi-circular scales 294 and 295, the former relating to the length of the notes and the latter to the degrees of inclination of the note-connecting strokes. Across this segment travels a hereinafter described indicator 282 carried by a hand-wheel 272 fixed to the front end of the actuator rod 273, which latter projects at its rear end between the arms of the sleeve fork, and has a universal joint connection 274 with a shaft 275, (Fig. 39), that is supported in bearings 276 and 277, the said universal joint being arranged centrally of ring 243. Shaft 275 carries two loose wheels 278 and 279 whose upper peripheral portions 281 and 280 are notched in conformity with the markings upon sector 248, and whose lower peripheral portions are formed with gear teeth, the first-mentioned portions being normally engaged by spring-controlled pins, one of which is shown in Fig. 42. Since these notches correspond to the markings on sector 248, as has already been stated, the movements of the wheels relative to said pins will be shown by the passage of the indicator over said sector.

The gear teeth on wheels 278 and 279 respectively engage a pinion 283 and a rack 284, the former of which controls the degree of inclination of the connecting strokes hereinafter described, while the latter serves to operate the pinion 285 of the transformer. Rotary movement is imparted to said wheels by means of a sliding clutch sleeve 286 which is keyed on shaft 275 and is provided at opposite ends with pins 287 and 288 designed for reception in openings formed in the adjacent wheels. Said sleeve is normally coupled to wheel 279 except when the parallel note-connecting strokes are to be written, in which instance it is coupled to wheel 278 through the agency of the shifting fork 289 which is mounted on a rock shaft 290 operated by the keys L'—L$^v$. Rotation of rod 273, which is transmitted directly to shaft 275, will therefore produce rotation of either of said wheels, according to the position of the clutch sleeve.

In writing the connecting strokes, either the platen and its carriage are merely shifted endwise, or the former is rotated during its endwise movement, according as the strokes are horizontal or inclined. The indicator 282 carried by the hand wheel 272 is of right-angular shape, as shown in Fig. 41, one arm 291 coacting with the outer semi-circular scale 294 marked on the front face of sector 248, while the other arm 292 coacts with the inner scale 295, the first-named scale reading in lengths of time for the notes, and the second-named scale in degrees of inclination. When the strokes to be written are horizontal, the indicator arm is set at zero, but when they are set at an angle, said arm is moved to one side or the other of the zero point, whereupon a corresponding rotation is imparted to wheel 278 and thence to pinion 283. The vertical shaft 283' whereon said pinion is mounted is connected by bevel gearing 296 to a horizontal shaft 296' which, in turn, drives a rack bar 298. (Fig. 40), through the intermediation of a pinion 297. Rack 298 is connected by a rod 299 to one end of a slotted link 300 which is fulcrumed at its other end on a pin 301 and has arranged above it a precisely similar link 302, (Fig. 35), rigidly connected to a rack bar 303 that meshes with a gear segment 304 fixed to shaft 236. The slots in these two links receive a stud 305 carried at one end of a rod 306, whose other end has a pivotal connection with the adjacent end of a rack bar 307.

One of the side members of the striking frame 265 is adapted to be connected, under certain conditions, by means of a spring-actuated pin 309, (Fig. 40) with the uppermost member 341 of a multiplying gear train 308, (Fig. 36), the lowermost member of which is engaged with rack 307. The latter also engages a pinion 310', (Fig. 20), whose spindle bears a winding pulley 311', to which one end of cable 186 is connected, the said cable being trained over the guide pulley 312' and connected to the lower frame 142 of the carriage. When the striking frame and gear train are thus connected and the actuator is depressed, the latter depresses the striking frame which in turn, operates said gear train and, consequently, the rack, said rack, in turn, rotating pulley 311' to wind up cable 186, which operation serves to pull the carriage to the right, irrespective of the displacement of its frame 143 with respect to frame 142. When the pressure upon the actuator is relieved, frame 142 automatically returns to the position which it occupied prior to being displaced to effect the printing of the note-connecting strokes.

During its movement, rack 307 shifts the aforementioned stud 305 correspondingly, as will be understood, and if, prior to its depression, the actuator be rotated to swing link 300 to the left, (through the agency of rack 298), into the position shown in full lines in Fig. 35, then when the actuator is depressed, rack 307 will move toward the rear of the machine and will pull stud 305 in the same direction. In consequence, the passage of said stud through the slots of both links will force it, during its travel, to move link 302 laterally to the left, thereby causing rack 303 to rotate segment 304. The front edge of said segment is provided with an upstanding comb 310 having as many teeth as the comb 246, the two sets of teeth corresponding radially when the segment is in its central or neutral position, and with this comb 310 is associated an indicator 311, which is connected to the actuator sleeve 240 by a forked rod 312 and is normally held in raised position, so that depression of said actuator will engage said indicator in the particular tooth space in comb 310 that corresponds to the tooth space in comb 246 wherein the nose 245 of indicator 244 is to be engaged. Subsequent depression of the actuator will then swing segment 304 as above explained, and the latter will move indicator 311 with it in the same direction and to the same extent. To permit these operations, however, it is necessary to render the actuator independent of the indicator 311, which may be effected in the following way:—The bearing shaft 236 is constructed in two sections whose confronting ends carry collars 313 and 314, (Fig. 38), the last-mentioned collar being connected to the corresponding shaft section by means of a pin 315 whose inner end slides in a longitudinal keyway formed in said section. These collars are coupled through the agency of a tooth 312², formed on collar 313, which engages in a notch in collar 314, the latter collar being normally forced toward the former by a spring 316. The upper shaft section carries the fixed collar 252, and this collar is formed with an arm on which a lever 319 is centrally fulcrumed, said lever having one of its arms provided with a roller 318 and its other arm forked and connected to the sliding collar 314 by a pair of links 320. Roller 318 is engageable by the head of an inverted T-shaped lever 317 which is fastened at the end of its stem to the arm 241 of the fork formed on the rear end of the actuator sleeve 240, and when the actuator is depressed, it will move the lever 317 in the direction of the arrow, (Fig. 38), thus depressing the roller end of lever 319, with the result that the upward movement of the forked end of that arm raises collar 314 out of engagement with collar 313. The lower section of shaft 236 is thus enabled to rotate independently of and relative to the upper section, such movement being effected by the indicator 311, which is then free to move both vertically and horizontally, and being transmitted through the crank 235, and the parts connected therewith, to the platen. It will be seen, therefore, that by lowering the actuator, two movements are simultaneously transmitted to the platen, one an endwise movement in either direction, and the other a rotary movement, the resultant effect, when the proper type is pressed against the paper, being that lines slanting at any angle to the staff lines are printed.

To position the notes in the bars according to their proper tempo, the transforming device is utilized, this device which is located below the carriage and behind the keylevers, serving to regulate the extent of the movement of the carriage for each note. As shown in Fig. 42, a wheel 321 is mounted for sliding movement upon a vertical shaft 322 of square section and has both its upper face and its periphery formed with a series of fifty-one teeth, the corresponding teeth forming continuations of each other. Said wheel is normally held in raised position by a spring 328, so as to engage its face teeth 323 with a pawl 325, which is loose on shaft 322 and is disposed above and radially of the wheel, said pawl normally tending to swing from left to right under the influence of a suitable controlling spring. On said shaft is also loosely mounted the aforementioned pinion 285 (Fig. 40), which is actuated by rack bar 284, the latter being actuated, in turn, by wheel 279. Pinion 285 is provided with a depending finger 327 that is designed for engagement with pawl 325, to stop the same in any desired position. Shaft 322, whereon wheel 321 is mounted, constitutes the lowermost section of what may be considered as the transformer shaft, of which the shaft 174 that is connected by the gears 172 and 170 to the carriage shaft 171 (Fig. 25), is the uppermost section, these two sections being connected to the intermediate section 329 by universal joints, as represented in Fig. 42.

The inner side member of the striking frame 265 is provided at its rear end with an extension 269, and this extension, when the frame is depressed, operates to raise a slotted link 270, (Fig. 52), which, in turn, rocks a centrally fulcrumed lever 271. At its inner end, this lever is provided with a fork which engages the grooved hub of wheel 321 and, when said lever is rocked, lowers said wheel, thus disengaging its teeth 323 from pawl 325, the latter then being free to swing from left to right until it is stopped by contact with finger 327. When the striking frame rises, the wheel 321 will also rise, and be reëngaged by pawl 325, but since the driving force exerted upon said wheel is greater than the resistance opposed thereto by the action of the pawl-controlling spring, the wheel will swing said pawl backward until it strikes against the adjacent member of a frame 326', which member is provided with a check pawl or detent 326 that engages the peripheral teeth 324 on said wheel. The adjustment of pinion 285 is, of course, controlled by the handle wheel 272 of the actuator, the extent of movement of wheel 321, as effected by the swinging movement of paw 325, being directly proportionate to the length of the arc through which finger 327 has moved. When the said finger and pawl are in contact at the time of operation of lever 271, no movement of said wheel will be produced, this being the case in chord-printing.

The keys for effecting the printing of the greater part of the musical marks, signs etc., may be advantageously arranged in six rows, as shown in Fig. 32. The operation of most of these keys requires no explanation, as their depression serves to bring the corresponding type characters on the printing drums into position opposite the printing line; they may be used either independently of or in conjunction with the actuator, according to the nature of the printing which they effect. The keys of the first row, however, are utilized to operate the wheel-bearing levers 199, shown in Figs. 19, 20 and 43. These levers, with the exception of the ones which carry the vertically and horizontally displaceable printing rollers, are all alike, and each is provided at its front end with the proper printing wheel 335, with which an inking roller 336 contacts, and at its rear end with an angular extension or arm 334, and is fulcrumed at its point of junction with such arm on an arcuate supporting frame 331, (Fig. 43). The aforesaid arm is connected by a rod 334' to a bell-crank 333, to whose outer or front arm the key bar 332 is connected, so that depression of a key-bar will operate to swing the corresponding lever 199 into position to impress its printing wheel against the paper, whereupon the actuator may be manipulated to impart either a rotary or an endwise movement, or a combination of such movements, to the platen, according as it is desired to print vertical, horizontal or inclined lines. In view of the explanation given in connection with the corresponding printing characters in the first form of the invention, additional description is deemed unnecessary.

In the present form, it is necessary to couple the sleeve 286, (Fig. 39), to wheel 278, in order to effect the horizontal and inclined line printing, as has already been stated, and, also, to engage the pin 309 in the side member of the striking frame 265, in order to terminate the rotation of the platen with the translation of the carriage frame 142. To effect this first coupling, the rear portions 337 of all of the keys L'... L$^v$ are connected with a rocking frame 338, (Figs. 39 and 40), which is connected by the two cranks 338' with the rock shaft 290, so that depression of any one of the keys specified will operate to lift said frame and thus actuate said rock shaft, the movement of the part last mentioned rocking fork 289, which, in turn, shifts the coupling sleeve. The second coupling is obtained by means of a crank 389, which is mounted on shaft 290 adjacent one end thereof and carries a cam or wedge 340 that engages the square pin 309 and forces the end of same into a corresponding opening provided therefor in the side member of the striking frame. This pin is mounted in the segment 341 included in the gear train 308, and, therefore, as long as the key remains depressed the coupling of the striking frame and the gear train will continue, and the depression of the said frame itself will then operate said train to shift the rack 307 that controls the combined endwise and rotary movement of the platen.

Figure 45:
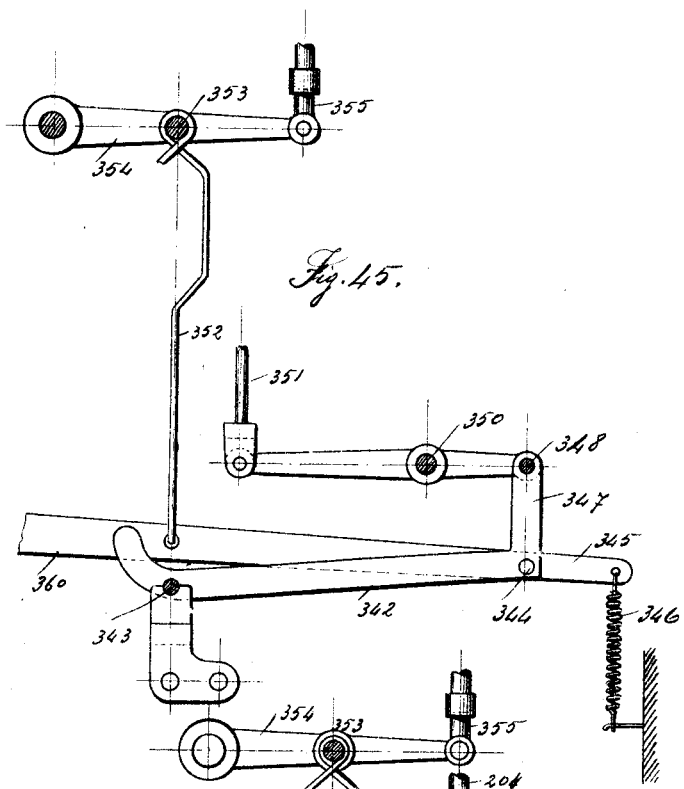
Figure 46:
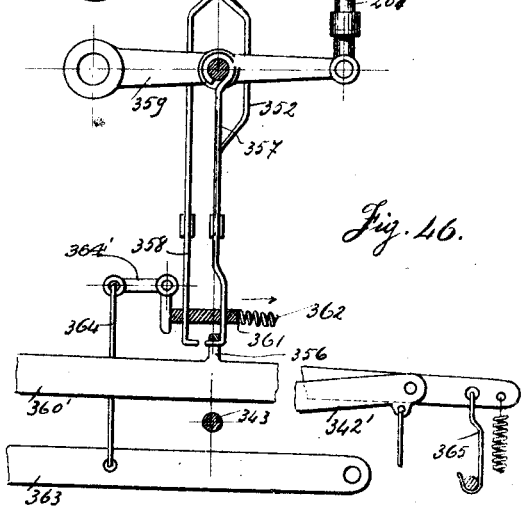

The tracing of the staff, effected by operation of key R, is accomplished before the writing of the notes, and as soon as one line is printed the platen is rotated, to produce the requisite spacing, the second line being printed during the return movement of the carriage. As previously stated in connection with the description of the printing drums, the type characters thereon may have any suitable arrangement both as to the various rows, and, also, to the characters comprehended therein. The keys of the key-board have a corresponding arrangement, as will be understood, and certain of these keys may be operated without it being necessary to manipulate the actuator. Referring to Fig. 32, wherein the key-board is depicted:

it has already been stated that the first of the six rows of keys control the line printing, and the printing of the bars, (key I'), the "arpeggios", (key I''), and the "ligature", (key L^v). The second and third rows of keys effect, generally, the printing of the marks over the heads of the notes, the dots, staccato signs, etc., the numbers and certain of the letters, and these keys, or certain of them act in conjunction with the case keys, so as to bring different sets of type opposite the printing line. But as the entire arrangement of the key-board is, in the main, arbitrary, it is not considered necessary to enter into an extended description thereof. The operation of those keys which act independently of the actuator is illustrated in Figs. 21 and 45, wherein a fork 342 is shown as pivoted adjacent its front end on a shaft 343 and as connected at its rear end to a rod 344 on which the corresponding key 360 is fulcrumed, the rear end 345 of the latter being connected to a coil-spring 346 that serves to normally elevate the key. The vertical arm 347 of the fork 342 has a terminal connection with a horizontal rod 348 which passes through a frame bar 349, connected, in turn, at its front end to a vertical rod 351 that serves to swing the left-hand drum 191 against the platen in the same way that the corresponding operation of the right-hand drum 192 is accomplished by the rod 215, (Fig. 29). Key 360 has a connection 352 with a horizontal rod 353 mounted in a frame 354, the rear ends of this frame having connected thereto a vertical rod 355 that is connected with drum 191, to effect the rotation thereof, in which respect it corresponds to the rod 204 previously described. Both of these operations are produced by lowering the key, as will be obvious, the rotation of the drum taking place during the initial portion of the movement of the key, while its impact against the platen is effected during the remainder of such movement. The keys in the remaining three rows and certain of those in row III, with the exception of the case keys F', P' and G' and the key S' are used in printing both musical marks, notes, etc. and the ordinary alphabetical letters, and they have this peculiarity that they are operated in conjunction with the actuator in music writing, and independently thereof when used for writing the letters. The arrangement of these keys is similar in the main to that previously described, and is illustrated in Fig. 46, where the numerals 360' and 363 indicate, respectively, one of the said keys and one of the case keys. Key 360' is provided with an eye 356 which is alternately engaged by the oppositely-facing noses on the lower ends of a pair of vertical rods 357 and 358, the former of which serves to connect key 360' with the frame 359 to which the drum-operating rod 204 is attached, while the rod 358 is connected to the frame rod 353. Both rods 357 and 358 pass through openings in a shifting bar 361, which has connected to one end thereof a controlling spring 362 that serves to normally couple the first-named rod to eye 356, the other end of said bar being engaged by a bell-crank lever 364' operative by a rod 364 attached to the case key 363. In consequence of this arrangement, when it is desired to print one of the characters on the right-hand drum, the proper key 360' is operated in conjunction with the actuator, but when characters on the left-hand drum are to be printed, the case key is first depressed to operate the shifting bar 361, after which the desired key 360' is depressed.

When figures are to be printed during music writing, it is necessary to effect the swinging movement of the right-hand drum 192 through the agency of the actuator. In Fig. 47, the key 360' is shown as provided with a hook 365 which engages a rod 366 mounted in the rear portion of a frame 367 which has connected thereto a lever 368, the latter being connected by a vertical rod 369 with the rear end of a lever 370 pivoted centrally to the lower end of rod 215. To the front end of lever 370 is connected a depending rod 371 formed toward its lower portion with a slot 372, and below this slot with a hook 375, the lateral projection 268 on the inner side member of the striking frame extending into said slot. By depressing key 360' until it rests upon shaft 343 and then rocking it upon the latter as a fulcrum, the frame 367, and, consequently, the lever 370, will also be rocked, the front arm of said lever rising and thus bringing the projection 268 into position at the bottom of slot 372. Depression of the striking frame by the actuator will then exert a downward pull upon rod 215, thereby effecting the impact of drum 192 against the platen, and by depressing a second key while the striking frame is still lowered another musical figure may be printed as a complement to the first, without occasioning any axial movement of the platen.

The several keys in rows III, IV and V which print the heads of the notes must when lowered, eventually couple the hook 249 on the actuator with the noses 261 on the levers 260 that serve to print the strokes across the heads and stems or tails of the notes above and below the staff. To effect this coupling the fork 342', shown in Fig. 47, is connected adjacent its rear end with an arm 259' on the shaft 259 by a depending link 373, which transmits the movement of said fork to said shaft, thus raising rod 255 through the instrumentality of arm 256 and, in consequence, swinging hook 249 forwardly into engagement with the nose 261 on the adjacent lever 260, as previously described. When the keys in rows IV, V and VI are used for printing letters, operation of one of the case keys will swing hook 374 into engagement with hook 375 on rod 371, thus holding said rod against movement, so that depression of the printing key 360' will then pull rod 215 downward.

The arrangement and operation of parts for printing capitals is substantially as follows:—Frame 367, (Fig. 49), is secured to a sleeve 376 that is fitted loosely on shaft 377, so as both rock and slide endwise thereon. This frame is normally forced to the right by spring 378, thereby disposing its right-hand side bar beneath the nose 379 of lever 368, so that when key 360' is depressed, said frame will be raised and said lever will be actuated, with the result that the swinging movement of the right-hand drum 192 will be accomplished. Where the left-hand drum 191 is to be operated for the same purpose, frame 367 is shifted toward the left by the actuation of lever 380, the latter being provided with a yoke 381 which engages in a groove in sleeve 376. This movement of the sleeve brings the left-hand side member of said frame beneath the nose 383 of a lever 384 similar to lever 368, the said lever 384 being connected by rod 385 (Fig. 48), to the adjacent side member of frame 349 and, accordingly to rod 351.

While in music writing the endwise movement of the platen is effected through the agency of the actuator, in ordinary writing it is produced by means of the engagement of rod 386, (Fig. 50), with frame 367. Said rod is loosely pivoted at its lower end on lever 271, (Fig. 42), which latter actuates the transformer, as already described, and it is normally free of engagement with said frame, but is brought into such engagement by the actuation of lever 387 (Fig. 50), connected to one of the case keys.

When it is desired to shift the platen and its carriage the minimum distance, corresponding to a sixty-fourth note, the key S' (Fig. 42), is depressed, which serves to rotate wheel 321 through an arc of about the length of three teeth. Above said wheel is arranged a horizontal rod 388, (Fig. 42) provided with an upstanding finger 389 and a depending finger 390, the former engaging pinion 391, and the latter coöperating with pawl 325, to prevent the same from moving the wheel during its return stroke. When key S' is depressed, it serves to move rod 388 to the right, by reason of its connection with said rod as shown in the figure specified, whereupon finger 389 is caused to engage with pinion 391 and turn it in the same direction a distance corresponding to one tooth, the pawl 325 being held stationary at that time by the finger 390. The ratio between the teeth of the pinion and the wheel 321 is as 1 to 3, so that the requisite movement of the latter is thus insured.

The ordinary spacing is obtained by means of the key T, this key controlling the lever 392, (Fig. 51), which is pivoted to the side wall of the casing and supports the lever 271, (Fig. 42), through the intermediary of a depending slotted link 393. Depression of key T effects rotation of wheel 321 through any desired number of teeth, according to the adjustment of the hand wheel on the actuator.

What I claim and desire to secure by Letters Patent of the United States is:

1. In a typewriter, the combination, with a platen and its carriage; of an actuator; connections between said platen and said actuator for rotating the platen when the actuator is oscillated in one direction; and connections between said carriage and said actuator for shifting the carriage endwise when a movement of a different character is imparted to the actuator.

2. In a typewriter, the combination, with a platen and its carriage; of a keyboard; printing mechanism controlled by the keys thereof; and a single actuating element independent of the keys connected with the platen and with the carriage, said element being movable manually in one direction to rotate said platen, and in another direction to shift said carriage endwise.

3. In a typewriter, the combination, with a platen and its carriage; of a key-board; printing mechanism controlled by the keys thereof; and a single pivotally-mounted actuating element independent of the keys connected with the platen and with the carriage, said element being arranged to swing bodily in one direction to rotate said platen, and to move in another direction to shift said carriage endwise.

4. In a typewriter, the combination, with a platen and its carriage; of a key-board; printing mechanism controlled by the keys thereof; and a single pivotally-mounted actuating element independent of the keys connected with the platen and with the carriage, said element being arranged to swing bodily in a horizontal plane to rotate said platen, and in a vertical plane to shift said carriage endwise.

5. In a typewriter, the combination, with a platen and its carriage; of a key-board; printing mechanism controlled by the keys thereof; and a single pivotally-mounted actuating element independent of the keys connected with the platen and with the carriage, said element being arranged to swing bodily in a horizontal plane to rotate said platen, and in a vertical plane to shift said carriage endwise and simultaneously rotate said platen.

6. In a typewriter, the combination of a platen; a key-board; printing mechanism controlled by the keys; a pivotally-mounted striking frame disposed remote from the key-board at one side thereof; a depressible actuator extending directly over said frame to rock the same when depressed; and connections between said frame and said platen for operating the latter when the former is rocked.

7. In a typewriter, the combination of a platen; a key-board; printing mechanism controlled by the keys; a pivotally-mounted striking frame disposed remote from the key-board at one side thereof; a depressible actuator extending directly over said frame to rock the same when depressed; and connections between said frame and said platen for imparting to the latter a combined endwise and rotary movement when the former is rocked.

8. In a typewriter, the combination of a platen; a key-board; printing mechanism controlled by the keys; a pivotally-mounted striking frame disposed remote from the key-board at one side thereof; a depressible actuator extending directly over said frame to rock the same when depressed; and connections between said frame and said platen for imparting to the latter an endwise movement when the former is rocked.

9. In a typewriter, the combination of a platen; a key-board; printing mechanism controlled by the keys; a pivotally-mounted striking frame disposed remote from the key-board at one side thereof; a depressible actuator extending directly over said frame to rock the same when depressed; and connections between said frame and said platen for imparting to the latter an endwise movement when the former is rocked, said actuator including a rotatable member to determine the extent of such endwise movement.

10. In a typewriter, the combination of a platen; a key-board; printing mechanism controlled by the keys; a pivotally-mounted striking frame disposed remote from the key-board at one side thereof; a depressible actuator extending directly over said frame to rock the same when depressed; and connections between said frame and said platen for imparting to the latter a combined endwise and rotary movement when the former is rocked, said actuator including a rotatable member to determine the extent of the endwise movement.

11. In a typewriter, the combination of a platen; a key-board; printing mechanism controlled by the keys; a depressible striking frame; a depressible actuator extending directly over said frame, to operate the same; a gear train connected to impart a combined endwise and rotary movement to said platen; and means to couple one element of said train to said frame, thereby to actuate said train from said frame when the latter is depressed by said actuator.

12. In a typewriter, the combination of a platen; a key-board; printing mechanism controlled by the keys; a depressible striking frame; a depressible actuator extending directly over said frame, to operate the same; a gear train connected to impart a combined endwise and rotary movement to said platen; a movable pin for detachably coupling one element of said train to said frame, thereby to actuate said train from said frame when the latter is depressed by said actuator; and means to operate said pin.

13. In a typewriter, the combination of a platen; a key-board; printing mechanism controlled by the keys; a depressible striking frame; a depressible actuator extending directly over said frame to operate the same; a gear train; a rack operated by one element thereof; connections between said rack and said platen to shift the latter endwise during the driving movement of the former; separate connections between said rack and said platen for simultaneously rotating the platen; and means to couple another element of said train to said frame, for actuation thereby when said frame is depressed by said actuator.

14. In a music typewriter, the combination of a platen; a key-board; staff- and note-printing devices controlled by the keys; a horizontally-movable actuator independent of said keys; and connections between said platen and said actuator for rotating the former about its longitudinal axis during the horizontal movement of the latter to print the notes at the proper heights upon the staff.

15. In a music typewriter, the combination of a platen; a key-board; staff- and note-printing devices controlled by the keys; a vertical shaft; an actuating member independent of said keys connected to said shaft for rotating the same; and connections between said shaft and said platen for rotating the latter from the former to print the notes at the proper heights upon the staff.

16. In a music typewriter, the combination of a platen; a key-board; staff- and note-printing devices controlled by the keys; a vertical shaft; a horizontally-movable actuating member independent of said keys connected to said shaft for rotating the same during its horizontal movement; and connections between said shaft and said platen for rotating the latter from the former to print the notes at the proper heights upon the staff.

17. In a music typewriter, the combination of a platen and its axle; a rock shaft arranged parallel with said axle; connections between said shaft and said axle for rotating the latter when the former is rocked; a key-board; staff- and note-printing devices controlled by the keys; a horizontally-movable actuator independent of said keys; and connections between said actuator and said shaft for rocking the said shaft during the horizontal movement of the actuator.

18. In a music typewriter, the combination of a platen and its axle; a key-board; staff- and note-printing devices controlled by the keys; a rock shaft arranged parallel with said axle; connections between said shaft and said axle for rotating the latter when the former is rocked, to print the notes at the proper heights upon the staff; a vertical shaft operatively connected with said rock shaft; and a horizontally-movable actuator connected to said vertical shaft for rotating the same.

19. In a typewriter, the combination of a platen; a key-board; printing mechanism controlled by the keys; a horizontally and vertically movable actuator independent of said keys; connections between the actuator and the platen for rotating the latter during the horizontal movement of the former; and separate connections between said actuator and said platen for moving the platen endwise during the vertical movement of the actuator.

20. In a typewriter, the combination of a platen; a key-board; printing mechanism controlled by the keys; a horizontally and vertically movable actuator independent of said keys; connections between the platen and the actuator for moving the latter endwise when the former is moved vertically; and a vertical shaft connected with said platen for rotating the same, said shaft being connected to said actuator for rotation thereby during its horizontal movement.

21. In a typewriter, the combination, with a platen; of an actuating element mounted for both oscillatory and rotary movements; connections between said element and said platen for moving the latter endwise when the former is oscillated; and separate connections between said element and said platen for determining the extent of such endwise movement when said element is rotated.

22. In a typewriter, the combination, with a platen; of an actuating element mounted for both horizontal and vertical movement; connections between said element and said platen for moving the latter endwise when the former is depressed; and separate connections between said element and said platen for rotating the latter when the former is moved horizontally.

23. In a typewriter, the combination, with a platen; of an actuator mounted for swinging movement in both horizontal and vertical planes and for rotary movement about its axis, for rotating the platen during its horizontal movement and for moving said platen endwise during its vertical movement, the rotary movement of said element determining the extent of the said endwise movement of the platen.

24. In a typewriter, the combination, with a platen, a key-board, and printing mechanism controlled by the keys; of an actuator independent of said keys mounted for both vertical and oscillatory movement, to move said platen endwise during its vertical movement and to rotate said platen during its oscillatory movement.

25. In a typewriter, the combination, with a platen, a key-board, and printing mechanism controlled by the keys; of a single actuating element connected with the platen to impart separate endwise and rotary movements thereto, said element being adapted to be grasped and manipulated manually to impart such movements to said platen.

26. In a music typewriter, the combination, with a platen; of printing means embodying levers provided with line-printing devices, and additional levers provided with note-printing devices; means for operating said levers; and means for imparting a combined rotary and endwise movement to the platen during the operation of the first-named levers to print the inclined lines connecting the stems of groups of notes.

27. In a typewriter, the combination, with a platen; of an oscillatory actuator comprising a spindle, and a sleeve wherein said spindle is revolubly fitted; connections between said sleeve and said platen for moving the latter endwise during the oscillation of the former; and connections between said spindle and said platen for determining the extent of such endwise movement when the spindle is revolved.

28. In a typewriter, the combination, with a platen, and a key-board; of printing mechanism controlled by the keys; and an actuating element mounted for oscillatory movement in both horizontal and vertical planes connected with the platen for imparting to the latter a rotary movement during its horizontal movement, and a combined rotary and endwise movement during its depression.

29. In a music typewriter, the combination, with a platen, and staff- and note-printing devices; of means for imparting endwise movement to the platen; and transforming mechanism connected with said platen for regulating the extent of such movement in accordance with the length of each note printed.

30. In a music typewriter, the combination, with a platen, and staff- and note-printing devices; of means for imparting endwise movement to the platen; and transforming mechanism connected with said platen for regulating the extent of such movement in accordance with the length of each note printed, said mechanism embodying a vertical shaft, means for rotating the same, a member for automatically terminating such rotation and means for adjusting said member to conform to the length of the particular note to be printed.

In testimony whereof I hereunto affix my signature in the presence of two witnesses.

ANDREA FERRETTO.

Witnesses:
B. CARLO SALEDO,
P. DE ARAMISCIS.